United States Patent
Lee et al.

(10) Patent No.: US 9,723,245 B2
(45) Date of Patent: Aug. 1, 2017

(54) DATA TRANSMITTING APPARATUS, DATA RECEIVING APPARATUS, DATA TRANSCEIVING SYSTEM, METHOD FOR TRANSMITTING DATA, AND METHOD FOR RECEIVING DATA

(71) Applicant: SAMSUNG ELECTRONICS CO., LTD., Suwon-si (KR)

(72) Inventors: Kyeong-jae Lee, Seoul (KR); Soo-young Kim, Suwon-si (KR); Jong-hwa Kim, Suwon-si (KR); Il-ju Na, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 2 days.

(21) Appl. No.: 14/212,710

(22) Filed: Mar. 14, 2014

(65) Prior Publication Data

US 2014/0267905 A1 Sep. 18, 2014

Related U.S. Application Data

(60) Provisional application No. 61/802,807, filed on Mar. 18, 2013, provisional application No. 61/789,803, filed on Mar. 15, 2013.

(30) Foreign Application Priority Data

Mar. 3, 2014 (KR) .................. 10-2014-0025030

(51) Int. Cl.
*H04N 5/60* (2006.01)
*H04N 21/41* (2011.01)
(Continued)

(52) U.S. Cl.
CPC ......... *H04N 5/602* (2013.01); *H04L 65/4084* (2013.01); *H04L 65/602* (2013.01);
(Continued)

(58) Field of Classification Search
CPC ........ H04N 5/602; H04N 5/4401; H04N 5/45; H04N 5/44591; H04N 21/4122;
(Continued)

(56) References Cited

U.S. PATENT DOCUMENTS 7,735,111 B2 6/2010 Michener et al.
8,166,503 B1 4/2012 Rosenberg et al.
(Continued)

FOREIGN PATENT DOCUMENTS

EP 2 257 051 A1 12/2010
EP 2276192 A2 1/2011
(Continued)

OTHER PUBLICATIONS

ITU-R BS.2159-4, "Multichannel sound technology in home and broadcasting applications", May 2012, Total 54 pages, BS Series, Broadcasting service (sound).
(Continued)

*Primary Examiner* — Idriss N Alrobaye
*Assistant Examiner* — Ronald Modo
(74) *Attorney, Agent, or Firm* — Sughrue Mion, PLLC

(57) ABSTRACT

Provided are data transmitting apparatuses and methods, data receives apparatuses and methods, and data transceiving systems and methods. A data transmitting apparatus includes: a packet generator configured to generate an audio metadata packet; and a transmitter configured to transmit the generated audio metadata packet to a data receiving apparatus, wherein a header of the generated audio metadata packet includes a split screen information field in relation to audio data represented by the generated audio metadata packet.

30 Claims, 28 Drawing Sheets

(51) Int. Cl.

| | | |
|---|---|---|
| *H04L 29/06* | (2006.01) | |
| *H04N 21/422* | (2011.01) | |
| *H04N 21/4363* | (2011.01) | |
| *H04N 21/84* | (2011.01) | |
| *H04N 21/431* | (2011.01) | |
| *H04N 21/435* | (2011.01) | |
| *H04N 5/45* | (2011.01) | |
| *H04N 21/81* | (2011.01) | |
| *H04N 5/445* | (2011.01) | |
| *H04N 5/44* | (2011.01) | |
| *H04N 21/436* | (2011.01) | |
| *H04N 21/442* | (2011.01) | |

(52) U.S. Cl.
CPC ......... *H04L 65/607* (2013.01); *H04N 5/4401* (2013.01); *H04N 5/44591* (2013.01); *H04N 5/45* (2013.01); *H04N 21/4122* (2013.01); *H04N 21/435* (2013.01); *H04N 21/4316* (2013.01); *H04N 21/4363* (2013.01); *H04N 21/43615* (2013.01); *H04N 21/44231* (2013.01); *H04N 21/8106* (2013.01); *H04N 21/84* (2013.01); *G06F 2203/04803* (2013.01); *H04N 21/43635* (2013.01); *H04N 21/43637* (2013.01)

(58) Field of Classification Search
CPC ......... H04N 21/44231; H04N 21/4363; H04N 21/43615; H04N 21/84; H04N 21/4316; H04N 21/435; H04N 21/8106; H04L 65/4084; H04L 65/602; H04L 65/607
See application file for complete search history.

(56) References Cited

U.S. PATENT DOCUMENTS

| | | | |
|---|---|---|---|
| 8,270,641 | B1 | 9/2012 | Greenberg |
| 9,154,585 | B2 | 10/2015 | Kim et al. |
| 9,497,297 | B2 | 11/2016 | Kim et al. |
| 2003/0115601 | A1 | 6/2003 | Palazzo et al. |
| 2003/0179283 | A1* | 9/2003 | Seidel .................. H04N 5/4401 348/14.01 |
| 2005/0036519 | A1 | 2/2005 | Balakrishnan et al. |
| 2005/0076136 | A1 | 4/2005 | Cho et al. |
| 2006/0044998 | A1 | 3/2006 | Takakuwa et al. |
| 2007/0253677 | A1 | 11/2007 | Wang |
| 2007/0297509 | A1 | 12/2007 | Mizobuchi et al. |
| 2008/0267588 | A1 | 10/2008 | Iwase et al. |
| 2009/0154499 | A1 | 6/2009 | Yamakage et al. |
| 2009/0157750 | A1 | 6/2009 | Kim et al. |
| 2009/0180760 | A1 | 7/2009 | Castillo |
| 2009/0290600 | A1 | 11/2009 | Tatsuta et al. |
| 2010/0054706 | A1* | 3/2010 | McCrossan .......... G11B 20/1262 386/241 |
| 2010/0088406 | A1 | 4/2010 | Yu et al. |
| 2010/0215044 | A1 | 8/2010 | Lee et al. |
| 2011/0170614 | A1 | 7/2011 | Moriyama et al. |
| 2012/0240180 | A1 | 9/2012 | Lin |
| 2012/0274850 | A1 | 11/2012 | Hawkins et al. |
| 2012/0327300 | A1 | 12/2012 | Hutchings et al. |
| 2013/0014193 | A1* | 1/2013 | Emura .................. H04N 21/242 725/114 |
| 2013/0063668 | A1 | 3/2013 | Yamashita et al. |
| 2013/0222690 | A1 | 8/2013 | Kim et al. |
| 2013/0223448 | A1 | 8/2013 | Kim et al. |
| 2013/0223456 | A1 | 8/2013 | Kim et al. |
| 2014/0118616 | A1 | 5/2014 | Oughriss et al. |
| 2015/0195389 | A1 | 7/2015 | Kim et al. |

FOREIGN PATENT DOCUMENTS

| | | |
|---|---|---|
| EP | 2461607 A1 | 6/2012 |
| EP | 2485478 A2 | 8/2012 |
| JP | 2012-133369 A | 7/2012 |
| KR | 10-2005-0047608 A | 5/2005 |

OTHER PUBLICATIONS

Office Action dated Nov. 12, 2015, issued by the United States Patent and Trademark Office in U.S. Appl. No. 14/213,074.
Communication dated Jun. 1, 2015, issued by the U.S. Patent Office in counterpart U.S. Appl. No. 14/213,074.
Communication dated Dec. 9, 2014, issued by the European Patent Office in counterpart European Application No. 14160037.9.
Communication dated Dec. 9, 2014, issued by the European Patent Office in counterpart European Application No. 14160082.5.
Communication dated Jul. 3, 2014 issued by the European Patent Office in counterpart European Patent Application No. 14160082.5.
Communication dated Jul. 3, 2014 issued by the European Patent Office in counterpart European Patent Application No. 14160037.9.
International Search Report dated Jul. 4, 2014 issued by the International Searching Authority in counterpart International Application No. PCT/KR2014/002230.
Written Opinion dated Jul. 4, 2014 issued by the International Searching Authority in counterpart International Application No. PCT/KR2014/002230.
International Search Report dated Jul. 10, 2014 issued by the International Searching Authority in counterpart International Application No. PCT/KR2014/002229.
Written Opinion dated Jul. 10, 2014 issued by the International Searching Authority in counterpart International Application No. PCT/KR2014/002229.
Office Action dated Jun. 9, 2016 issued by the U.S. Patent and Trademark Office in U.S. Appl. No. 14/213,074.
Office Action dated Mar. 17, 2017 issued by the United States Patent and Trademark Office in U.S. Appl. No. 14/213,074.

* cited by examiner

FIG. 4

| seg_nu[1:0]=00 | seg_nu[1:0]=01 | seg_nu[1:0]=10 | seg_nu[1:0]=11 |
|---|---|---|---|
| Stream 0 | Stream 4 | Stream 8 | Stream 12 |
| Stream 1 | Stream 5 | Stream 9 | Stream 13 |
| Stream 2 | Stream 6 | Stream 10 | Stream 14 |
| Stream 3 | Stream 7 | Stream 11 | Stream 15 |

| Split_Screen_Config [6:0] | Description |
|---|---|
| 0b000 0000 | Unspecified or single-view mode |
| 0b000 0001 | Split mode 1 (split by 2)<br> |
| 0b000 0010 | Split mode 2 (split by 2)<br> |
| 0b000 0011 | Split mode 3 (split by 2)<br> |
| 0b000 0100 | Split mode 4 (split by 3)<br> |

FIG. 8B

| Split_Screen_Config [6:0] | Description |
|---|---|
| 0b000 0101 | Split mode 5 (split by 3)<br><br>┌─────────────┐<br>│ Window 1    │<br>├─────────────┤<br>│ Window 2    │<br>├─────────────┤<br>│ Window 3    │<br>└─────────────┘ |
| 0b000 0110 | Split mode 6 (split by 3)<br><br>┌──────┬──────┐<br>│      │Window│<br>│Window│  2   │<br>│  1   ├──────┤<br>│      │Window│<br>│      │  3   │<br>└──────┴──────┘ |
| 0b000 0111 | Split mode 7 (split by 3)<br><br>┌──────┬──────┐<br>│Window│      │<br>│  1   │Window│<br>├──────┤  2   │<br>│Window│      │<br>│  3   │      │<br>└──────┴──────┘ |
| 0b000 1000 | Split mode 8 (split by 3)<br><br>┌─────────────┐<br>│ Window 1    │<br>├──────┬──────┤<br>│Window│Window│<br>│  2   │  3   │<br>└──────┴──────┘ |

FIG. 8C

| Split_Screen_Config [6:0] | Description |
|---|---|
| 0b000 1001 | Split mode 9 (split by 3)<br><br>\| Window 1 \| Window 2 \|<br>\| Window 3 \|\| |
| 0b000 1010 | Split mode 10 (split by 4)<br><br>\| Window 1 \| Window 2 \|<br>\| Window 3 \| Window 4 \| |
| 0b000 1011 | Split mode 11 (split by 4)<br><br>\| Window 1 \| Window 2 \|<br>\| \| Window 3 \|<br>\| \| Window 4 \| |
| 0b000 1100 | ...(TBD) |
| 0bxxx xxxx ~ 0b111 1111 | Reserved |

DATA TRANSMITTING APPARATUS, DATA RECEIVING APPARATUS, DATA TRANSCEIVING SYSTEM, METHOD FOR TRANSMITTING DATA, AND METHOD FOR RECEIVING DATA

CROSS-REFERENCE TO RELATED APPLICATIONS

This application claims the benefit of U.S. Provisional Application No. 61/802,807, filed in the United States Patent and Trademark Office on Mar. 18, 2013, and U.S. Provisional Application No. 61/789,803 filed in the United States Patent and Trademark Office on Mar. 15, 2013, and claims priority from Korean Patent Application No. 10-2014-0025030 filed in the Korean Intellectual Property Office on Mar. 3, 2014, the disclosures of which are incorporated herein by reference in their entireties.

BACKGROUND

1. Field

Apparatuses and methods consistent with exemplary embodiments relate to transceiving data, and more particularly, to a data transmitting apparatus which transceives split-screen support information, a data receiving apparatus, a data transceiving system, a method for transmitting data, and a method for receiving data.

2. Description of the Related Art

Recently, with the development of multimedia environments, a high-speed cable interface standard for transmitting various data has been suggested. For example, High Definition Multimedia Interface (HDMI) and Mobile High-Definition Link (MHL) describe a transmission standard of image data, audio data, and control data in various formats. With the advent of a multi-view technology which allows users to watch different contents through a single display apparatus, there is a need for a multi-audio transmission method.

In particular, in the case where users watch different contents by splitting a screen, there is a need to share information regarding in which format the screen is split between a source apparatus and a sink apparatus and which audio signal is matched with each of the split screens.

Accordingly, a standard for transceiving split-screen support information between a source apparatus and a sink apparatus is required.

SUMMARY

Aspects of one or more exemplary embodiments provide an interface standard for transceiving split-screen support information between a source apparatus and a sink apparatus.

According to an aspect of an exemplary embodiment, there is provided a data transmitting apparatus including: a packet generator configured to generate an audio metadata packet; and a transmitter configured to transmit the generated audio metadata packet to a data receiving apparatus, wherein a header of the generated audio metadata packet includes a split screen information field in relation with audio data represented by the audio metadata packet.

The split screen information field may include at least one of a split screen valid field indicating whether split screen is supported and a split screen type field indicating a type of split screen in relation with transmitted audio data.

The split screen type field may comprises one of a first split mode where a display screen is split horizontally, a second split mode where the display screen is split vertically, a third split mode where a picture-in-picture (PIP) screen is displayed within the display screen, and a fourth split mode where the display screen is split into three or more screens.

The header of the generated audio metadata packet may further include at least one of a view type field indicating whether a transmitted content is a multi-view content or a single-view content, a sequence number field indicating a sequence number of the audio metadata packet, and an audio stream number field indicating information on a number of transmitted audio streams.

A payload of the generated audio metadata packet may include a multi-audio descriptor field indicating metadata regarding a sub packet of a multi-audio sample packet.

The multi-audio descriptor may include at least one of a split screen tag field indicating split screen information corresponding to audio data represented by the generated audio metadata packet, an associated view ID field indicating a view corresponding audio data represented by the generated audio metadata packet, a valid language code field indicating whether the multi-audio descriptor field includes a valid language code, a mixed audio field indicating whether main audio data and supplemental audio data are pre-mixed, a supplemental audio type (SAT) present field indicating whether the multi-audio descriptor field includes information regarding a type of valid supplemental audio data, a supplemental audio type field indicating a type of supplemental audio data for audio data represented by the generated audio metadata packet, and a language code field indicating a language code, as defined by international Organization for Standardization (ISO) 639, of audio data represented by the generated audio metadata packet.

According to an aspect of another exemplary embodiment, there is provided a data receiving apparatus including: a receiver configured to receive an audio metadata packet from a data transmitting apparatus; and a parser configured to parse the received audio metadata packet, wherein a header of the received audio metadata packet includes a split screen information field in relation with audio data represented by the audio metadata packet.

The split screen information field may include at least one of a split screen valid field indicating whether split screen is supported and a split screen type field indicating a type of split screen in relation with transmitted audio data.

The split screen type field may comprise one of a first split mode where a display screen is split horizontally, a second split mode where the display screen is split vertically, a third split mode where a PIP screen is displayed within the display screen, and a fourth split mode where the display screen is split into three or more screens.

The header of the received audio metadata packet may further include at least one of a view type field indicating whether a transmitted content is a multi-view content or a single-view content, a sequence number field indicating a sequence number of the audio metadata packet, and an audio stream number field indicating information on a number of transmitted audio streams.

A payload of the received audio metadata packet may include a multi-audio descriptor field indicating metadata regarding a sub packet of a multi-audio sample packet.

The multi-audio descriptor may include at least one of a split screen tag field indicating split screen information corresponding to audio data represented by the received audio metadata packet, an associated view ID field indicating a view corresponding audio data represented by the received audio metadata packet, a valid language code field indicating whether the multi-audio descriptor field includes a valid language code, a mixed audio field indicating whether main audio data and supplemental audio data are pre-mixed, an SAT present field indicating whether the multi-audio descriptor field includes information regarding a type of valid supplemental audio data, a supplemental audio type field indicating a type of supplemental audio data for audio data represented by the received audio metadata packet, and a language code field indicating a language code defined ISO639 of audio data represented by the received audio metadata packet.

According to an aspect of another exemplary embodiment, there is provided a data transceiving system including: a data transmitting apparatus configured to generate an audio metadata packet and transmit the generated audio metadata packet to a data receiving apparatus; and the data receiving apparatus configured to receive the audio metadata packet from the data transmitting apparatus, wherein a header of the audio metadata packet includes a split screen information field regarding audio data represented by the audio metadata packet.

According to an aspect of another exemplary embodiment, there is provided a data transmitting method including: generating an audio metadata packet; and transmitting the generated audio metadata packet to a data receiving apparatus, wherein a header of the generated audio metadata packet includes a split screen information field regarding audio data represented by the audio metadata packet.

The split screen information field may include at least one of a split screen valid field indicating whether split screen is supported and a split screen type field indicating a type of split screen regarding transmitted audio data.

The split screen information field may include one of a first split mode where a display screen is split horizontally, a second split mode where the display screen is split vertically, a third split mode where a PIP screen is displayed within the display screen, and a fourth split mode where the display screen is split into three or more screens.

The header of the generated audio metadata packet may further include at least one of a view type field indicating whether a transmitted content is a multi-view content or a single-view content, a sequence number field indicating a sequence number of the audio metadata packet, and an audio stream number field indicating information on a number of transmitted audio streams.

A payload of the generated audio metadata packet may include a multi-audio descriptor field indicating metadata regarding a sub packet of a multi-audio sample packet.

The multi-audio descriptor may include at least one of a split screen tag field indicating split screen information corresponding to audio data represented by the generated audio metadata packet, an associated view ID field indicating a view corresponding audio data represented by the generated audio metadata packet, a valid language code field indicating whether the multi-audio descriptor field includes a valid language code, a mixed audio field indicating whether main audio data and supplemental audio data are pre-mixed, an SAT present field indicating whether the multi-audio descriptor field includes information regarding a type of valid supplemental audio data, a supplemental audio type field indicating a type of supplemental audio data for audio data represented by the generated audio metadata packet, and a language code field indicating a language code defined ISO639 of audio data represented by the generated audio metadata packet.

According to an aspect of another exemplary embodiment, there is provided a data receiving method including: receiving an audio metadata packet from a data transmitting apparatus; and parsing the received audio metadata packet, wherein a header of the received audio metadata packet includes a split screen information field regarding audio data represented by the audio metadata packet.

The split screen information field may include at least one of a split screen valid field indicating whether split screen is supported and a split screen type field indicating a type of split screen regarding transmitted audio data.

The split screen information field may include one of a first split mode where a display screen is split horizontally, a second split mode where the display screen is split vertically, a third split mode where a PIP screen is displayed within the display screen, and a fourth split mode where the display screen is split into three or more screens.

The header of the received audio metadata packet may further include at least one of a view type field indicating whether a transmitted content is a multi-view content or a single-view content, a sequence number field indicating a sequence number of the audio metadata packet, and an audio stream number field indicating information on a number of transmitted audio streams.

A payload of the received audio metadata packet may include a multi-audio descriptor field indicating metadata regarding a sub packet of a multi-audio sample packet.

The multi-audio descriptor may include at least one of a split screen tag field indicating split screen information corresponding to audio data represented by the received audio metadata packet, an associated view ID field indicating a view corresponding audio data represented by the received audio metadata packet, a valid language code field indicating whether the multi-audio descriptor field includes a valid language code, a mixed audio field indicating whether main audio data and supplemental audio data are pre-mixed, an SAT present field indicating whether the multi-audio descriptor field includes information regarding a type of valid supplemental audio data, a supplemental audio type field indicating a type of supplemental audio data for audio data represented by the received audio metadata packet, and a language code field indicating a language code defined ISO639 of audio data represented by the received audio metadata packet.

According to an aspect of another exemplary embodiment, there is provided a data transmitting apparatus including: a packet generator configured to generate a packet including a plurality of sub packets regarding a multi-audio stream; and a transmitter configured to transmit the generated packet to a receiving apparatus, wherein a header of the generated packet includes a sequence number field for identifying an order of the generated packet among a plurality of packets.

According to an aspect of another exemplary embodiment, there is provided a data receiving apparatus including: a receiver configured to receive a packet including a plurality of sub packets regarding a multi-audio stream; and a parser configured to parse the received packet, wherein a header of the received packet includes a sequence number field for identifying an order of the generated packet among a plurality of packets.

According to an aspect of another exemplary embodiment, there is provided a data transceiving system including: a data transmitting apparatus configured to generate a packet including a plurality of sub packets regarding a multi-audio stream and transmitting the generated packet to a data receiving apparatus; and the data receiving apparatus configured to receive the packet including the plurality of sub packets from the data transmitting apparatus, wherein a header of the received packet includes a sequence number field for identifying an order of the generated packet among a plurality of packets.

According to an aspect of another exemplary embodiment, there is provided a data transmitting method including: generating a packet including a plurality of sub packets regarding a multi-audio stream; and transmitting the generated packet to a data receiving apparatus, wherein a header of the generated packet includes a sequence number field for identifying an order of the generated packet among a plurality of packets.

According to an aspect of another exemplary embodiment, there is provided a data receiving method including: receiving a packet including a plurality of sub packets regarding a multi-audio stream; and parsing the received packet, wherein a header of the received packet includes a sequence number field for identifying an order of the generated packet among a plurality of packets.

According to an aspect of another exemplary embodiment, there is provided a data transmitting method including: a generator configured to generate a device capability information block including information on properties supported by a sink apparatus regarding audio data; and a transmitter configured to transmit the device capability information block to a data receiving apparatus, wherein the device capability information block includes a split screen audio field indicating whether the sink apparatus supports receiving and processing of multi-audio regarding split screen.

According to an aspect of another exemplary embodiment, there is provided a data receiving apparatus including: a receiver configured to receive a device capability information block including information on properties supported by a sink apparatus regarding audio data; and an analyzer configured to analyze the received device capability information block, wherein the device capability information block includes a split screen audio field indicating whether the sink apparatus supports receiving and processing of multi-audio regarding split screen.

According to an aspect of another exemplary embodiment, there is provided a data transceiving system including: a data transmitting apparatus configured to transmit a device capability information block including information on properties supported by a sink apparatus regarding audio data to a data receiving apparatus; and a data receiving apparatus configured to receive the device capability information block from the data transmitting apparatus, wherein the device capability information block includes a split screen audio field indicating whether the sink apparatus supports receiving and processing of multi-audio regarding split screen.

According to an aspect of another exemplary embodiment, there is provided a data transmitting method including: generating a device capability information block including information on properties supported by a sink apparatus regarding audio data; and transmitting the device capability information block to a data receiving apparatus, wherein the device capability information block includes a split screen audio field indicating whether the sink apparatus supports receiving and processing of multi-audio regarding split screen.

According to an aspect of another exemplary embodiment, there is provided a data receiving method including: receiving a device capability information block including information on properties supported by a sink apparatus regarding audio data; and analyzing the received device capability information block, wherein the device capability information block includes a split screen audio field indicating whether the sink apparatus supports receiving and processing of multi-audio regarding split screen.

According to an aspect of another exemplary embodiment, there is provided a data receiving apparatus, including: a receiver configured to receive a packet including a split screen information field in relation to audio data corresponding to the packet; and a parser configured to parse the received packet.

According to aspects of exemplary embodiments, an interface standard for transceiving split-screen support information between a source apparatus and a sink apparatus is provided.

BRIEF DESCRIPTION OF THE DRAWINGS

The above and/or other aspects will be more apparent by describing exemplary embodiments with reference to the accompanying drawings, in which:

FIG. 4 is a view illustrating a state where a payload of a multi-audio sample packet is being transmitted, according to an exemplary embodiment;

FIGS. 8A to 8C illustrate split-screen modes associated with an audio stream according to an exemplary embodiment;

DETAILED DESCRIPTION OF EXEMPLARY EMBODIMENTS

Figure 1A:
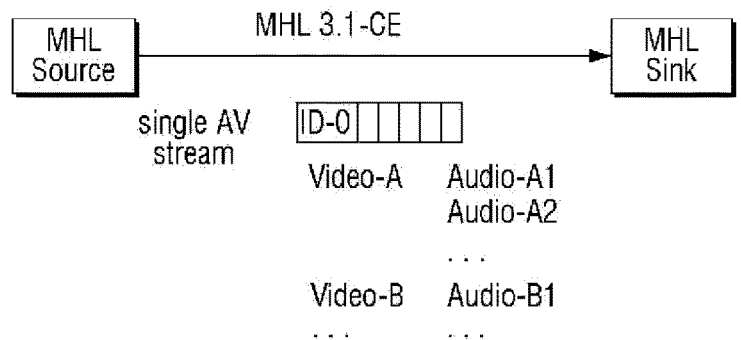
FIGS. 1A and 1B are views illustrating a single audio stream and a multi-audio stream.

It is understood that the method operations and system components have been represented by basic symbols in the drawings, showing sufficient details which are relevant for an understanding of the present disclosure. Further, descriptions that are readily apparent to person ordinarily skilled in the art may be omitted herein. In the present disclosure, relational terms such as first, second, and the like may be used to distinguish one entity from another entity, without necessarily implying any actual relationship or order between such entities. It is understood that, hereinafter, expressions such as "at least one of," when preceding a list of elements, modify the entire list of elements and do not modify the individual elements of the list.

Aspects of exemplary embodiments are applicable to various cable interface transmission standards such as High Definition Multimedia Interface (HDMI) and Mobile High-Definition Link (MHL) standards within the same scope as technical concepts of the present disclosure and thus, the scope of the present invention includes at least similar cable interface standard standards.

The present specification incorporates the disclosures of the following documents by reference:

ITU-R BS.2159-4 (May 2012), Multichannel sound technology in home and broadcasting applications.

SMPTE, SMPTE 2036-2:2008, "UHDTV—Audio characteristics and audio channel mapping for program production", 2008.

IEC, IEC 62574 ed 1.0, "Audio, video and multimedia systems—General channel assignment of multichannel audio, Apr. 7, 2011.

Table 1 briefly defines some terms which are used in this disclosure.

TABLE 1

Terms

| Term | Definition |
| --- | --- |
| MHL Source | A device with an MHL output port. An MHL Source shall use a receptacle and not a plug at its MHL output port. |
| MHL Sink | A device with one or more MHL input ports. An MHL Sink shall use a receptacle and not a plug at each MHL input port. |
| 3D Audio | An audio system whose speakers are placed anywhere in three-dimensional (3D) space. This is in contrast to 5.1 Audio or 7.1 Audio which do not include an element of height and typically place speakers in a horizontal two-dimensional (2D) plane. 3D Audio uses the channel layouts defined in ITU-R BS.2159-4 (Type B 10.2 ch), SMPTE2036-2 (22.2 ch), or IEC62574 (30.2 ch). 3D Audio also includes the down-mixed audio streams defined in these standards that include 9 or more audio channels. For the avoidance of doubt in this disclosure, 3D Audio refers to a finite number of discrete channels and not object-based audio. |

TABLE 1-continued

Terms

| Term | Definition |
| --- | --- |
| Multi-Audio | A collection of audio streams associated with one or more video streams. Multi-Audio is transported as a single AV Stream. For the avoidance of doubt in this disclosure, Multi-Audio does not refer to the transmission of multiple audio streams via Multi-AV Streaming. |
| Stream | A time-ordered set of digital data originating from one MHL Source and terminating at one MHL Sink. A Stream is characterized by bounded bandwidth requirements and by synchronization points, or time stamps, within the stream data. |
| AV Stream | A collection of packet data that includes multiple video Streams, multiple audio Streams, and auxiliary information about these Streams. Auxiliary information includes the characteristics of the video and audio Streams, and information on how to synchronize between the video and audio Streams. A packet ID is assigned to an AV Stream. |
| Multi-AV Stream | A collection of multiple AV Streams where a unique packet ID is assigned to each AV Stream. |
| Single-View | A view mode where only a single audio Stream is displayed on an MHL Sink. |
| Multi-View | A viewing option (of an MHL Sink) where two or more independent video Streams are simultaneously displayed on an MHL Sink, and where a viewer may only see one video Stream at any given time. Multi-View video may be transported via 3D Video Formats, where each independent video content is carried on the Left and Right stereoscopic pictures, respectively. |
| Window | A (spatial) subset of a video image that is displayed by an MHL Sink. A video image is composed of one or more Windows, where each Window does not overlap each other. |
| Split-Screen | A viewing option (of an MHL Sink) where two or more Windows are identified and tagged by the MHL Source (e.g., picture-in-picture TV viewing, TV quick-preview, multi-screen gaming). |

Figure 1B:
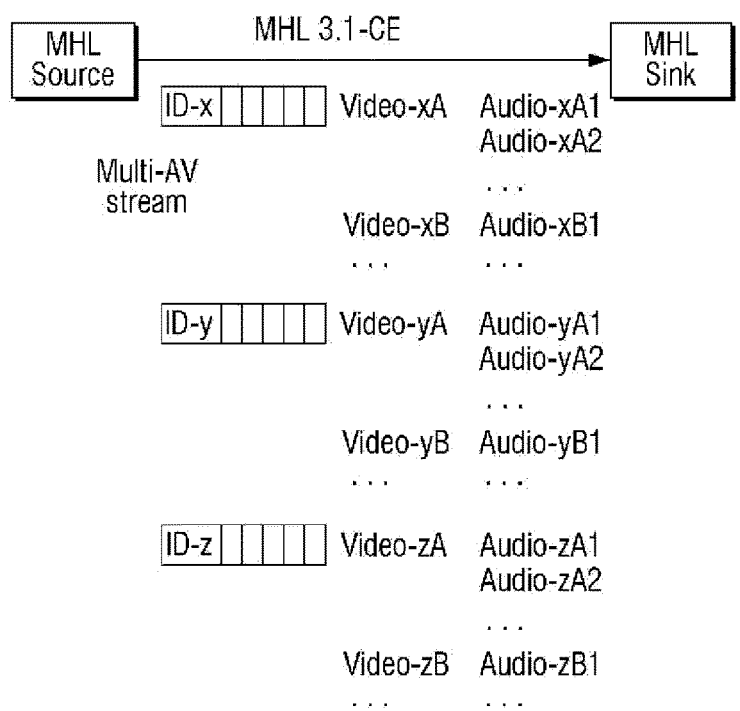

FIGS. 1A and 1B are views illustrating a single audio stream and a multi-audio stream.

As illustrated in FIG. 1A, a single audio stream corresponds to a case where a plurality of audio data exists with respect to at least one video data, and the audio data is transmitted to a single stream. In the single stream, all stream data is packetized to share the same packet stream ID.

As illustrated in FIG. 1B, a multi-audio stream is a case where a plurality of single AV streams are transmitted. In the multi-audio stream, a plurality of single-AV stream groups where a unique packet stream ID is assigned to each single AV stream exists. The video data of a plurality of single AV streams is interdependent.

Each audio stream of a multi-audio stream transmits as many as two audio channels, and is involved with a single audio stream. For example, each audio in a single view mode may be connected to a default video stream, and an audio in a dual view mode may be connected to a left image or a right image (or both). In addition, one or more supplemental audio options may be transmitted as described below. That is, supplemental audio options may include split-screen tagging, language indication, and indication of audio for visually/hearing impaired.

The split-screen is a viewing option where different audio data is tagged and identified by a source apparatus with respect to one or more windows. The split-screen is used in picture-in-picture viewing, quick-preview, multi-screen game, etc. Herein, the window is a distinctive display image which is displayed on one area of a screen of a sink apparatus.

The split-screen (or multi-window) may be a selective element which is used along with multi-audio. A split-screen mode, which refers to configuration where a screen is split in a sink apparatus, is tagged in an audio stream and is mapped with a specific window.

Figure 2A:
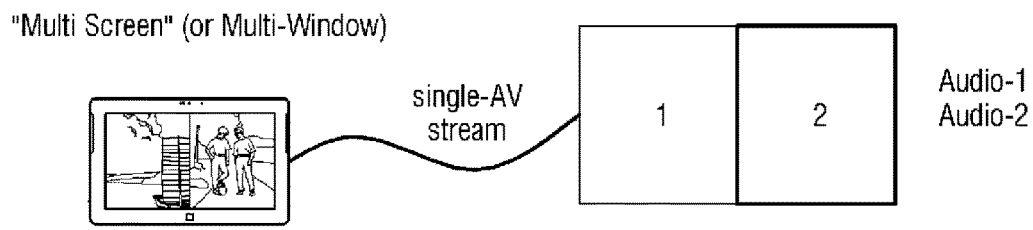
FIGS. 2A to 2C are views illustrating transmissions of multi-audio with respect to a dual window and split screen from a source apparatus to a sink apparatus, according to one or more exemplary embodiments.
Figure 2B:
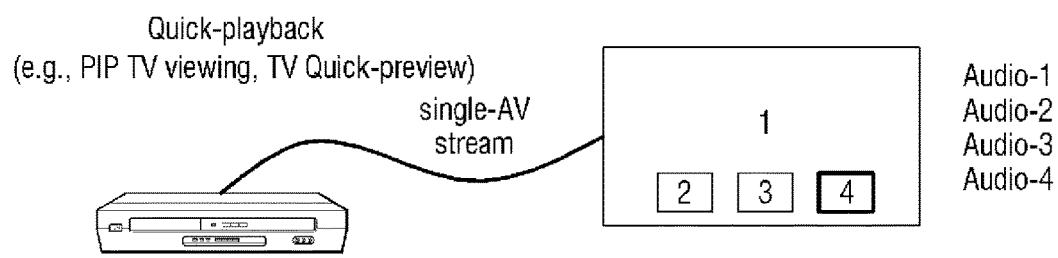
Figure 2C:
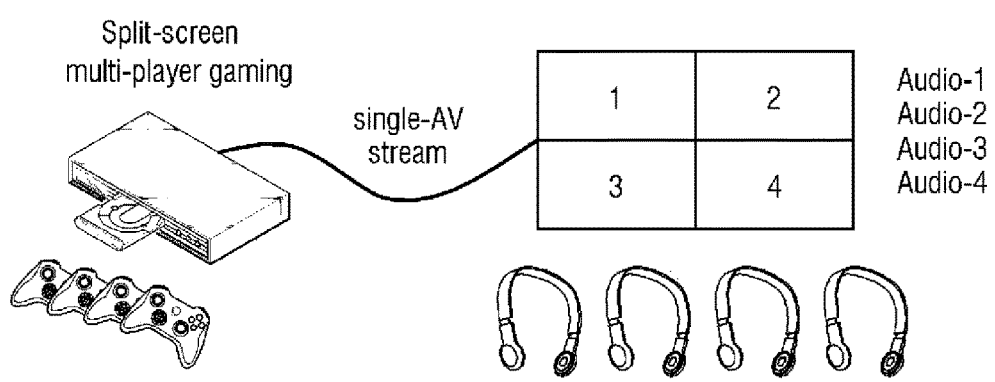

FIGS. 2A, 2B, and 2C are views illustrating transmissions of multi-audio with respect to a dual window and split screen from a source apparatus to a sink apparatus, according to one or more exemplary embodiments.

FIG. 2A illustrates an exemplary embodiment of transmitting audio data to each of multi-screens, FIG. 2B illustrates an exemplary embodiment of transmitting a plurality of audio data according to quick-preview viewing or picture-in-picture (PIP) viewing, and FIG. 2C illustrates an exemplary embodiment of transmitting a plurality of audio data according to a multi-screen game. A user of the sink apparatus may select and listen to desired audio data.

Figure 3:
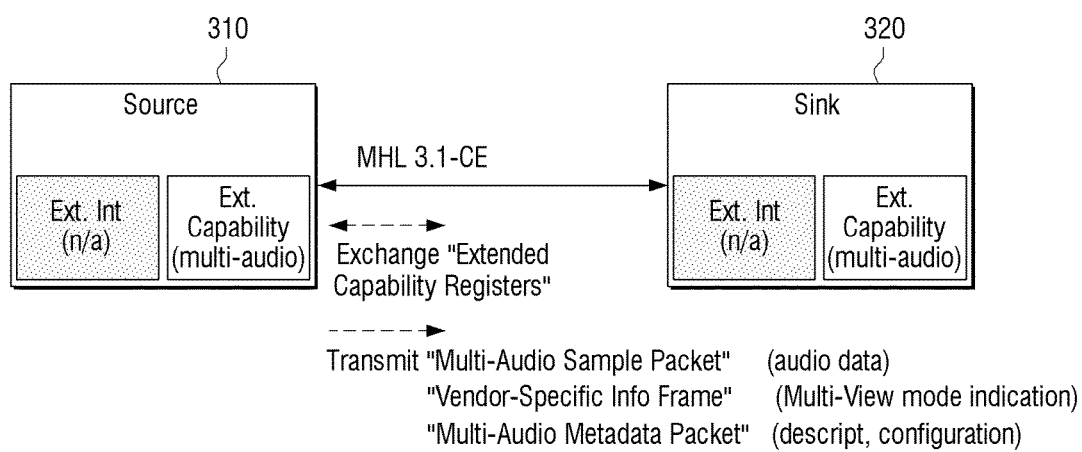
FIG. 3 is a view illustrating data transceiving between a sink apparatus and a source apparatus in order to display split-screen support information, according to an exemplary embodiment.

FIG. 3 is a view illustrating data transceiving between a sink apparatus 320 and a source apparatus 310 in order to display split-screen support information, according to an exemplary embodiment.

Referring to FIG. 3, the source apparatus 310 transmits a vendor-specific InfoFrame, a multi-audio sample packet, and a multi-audio metadata packet to the sink apparatus 320.

The multi-audio sample packet includes a plurality of audio streams. The multi-audio metadata packet includes one or more settings for each audio stream, which is related to a video stream and may deliver supplemental audio information. The vendor-specific InfoFrame includes a multi-view type of transmitted contents. Detailed descriptions will be provided below.

The sink apparatus 320 transmits an extended device capability register to the source apparatus 310 to provide information on a multi-audio mode which is supported by the sink apparatus. Detailed descriptions will be provided below.

Meanwhile, Supplementary Multi-Audio supports transmission of auxiliary audio tracks (e.g., multi-language, audio descriptions for the visually impaired, or clean audio for the hearing impaired). In this case, up to 16 stereo audio streams can be transmitted simultaneously. Detailed descriptions thereof will be provided below.

Transition-Minimized Differential Signaling (TMDS) and Encoding

Data Platform Packet

TABLE 2

Packet Types

| Packet Type Value | Packet Type | Section |
|---|---|---|
| 0 × 00 | Null | 4.x |
| 0 × 01 | Audio Clock Regeneration (N/CTS) | 4.x |
| 0 × 02 | Audio Sample | 4.x |
| 0 × 03 | Content Mute Packet | 4.x |
| 0 × 04 | 3D Audio Sample | 4.x |
| 0 × 05 | Multi-Audio Sample | 4.x |
| 0 × 06 | 3D Audio Metadata Packet | 4.x |
| 0 × 07 | Multi-Audio Metadata Packet | 4.x |
| 0 × 80 + InfoFrame Type | EIA/CEA-861E InfoFrame | 4.x |

3D Audio Sample Packet 3D audio is defined as audio where a speaker may be disposed at a predetermined position for each 3D audio standard (e.g. 10.2ch, 22.2ch, 30.2ch, etc.) in a 3D space. A 3D Audio Sample Packets includes one Audio Sample which contains 9 to 32 audio channels.

A 3D audio stream includes up to 32 audio channels (or more), and is transmitted through consecutive packets in a data sum section. Each packet includes up to 8 audio channels. The configuration of the sub packets is determined by the sequence number and the sample present bits in a header.

A sequence number field (sequence_number) indicates the order of the current packet. Since multiple 3D Audio Sample Packets include a single 3D Audio Sample, this field is used to correctly identify the packet order.

Other header fields and Subpacket structures are identical or similar to the Audio Sample Packet shown in the MHL 2.0 specification.

TABLE 3

3D Audio Sample Packet

| Byte | Bit # | | | | | | | |
|---|---|---|---|---|---|---|---|---|
| | 7 | 6 | 5 | 4 | 3 | 2 | 1 | 0 |
| HB0 | 0 | 0 | 0 | 0 | 0 | 1 | 0 | 0 |
| HB1 | 0 | 0 | sequence_number | | sample present.sp3 | sample present.sp2 | sample present.sp1 | sample present.sp0 |
| HB2 | B.3 | B.2 | B.1 | B.0 | sample flat.sp3 | sample flat.sp2 | sample flat.sp1 | sample flat.sp0 |
| PB0 | L.11 | ... | ... | ... | ... | ... | ... | L.4 |
| PB1 | L.19 | ... | ... | ... | ... | ... | ... | L.12 |
| PB2 | L.27 | ... | ... | ... | ... | ... | ... | L.20 |
| PB3 | R.11 | ... | ... | | | | ... | R.4 |
| PB4 | R.19 | ... | | | | | | R.12 |
| PB5 | R.27 | ... | ... | ... | ... | ... | ... | R.20 |
| PB6 | PR | CR | UR | VR | PL | CL | UL | VL |
| PB7 | L.11 | ... | ... | ... | ... | ... | ... | L.4 |
| PB8 | L.19 | ... | ... | ... | ... | ... | ... | L.12 |
| PB9 | L.27 | ... | ... | ... | ... | ... | ... | L.20 |
| PB10 | R.11 | ... | ... | | | | | R.4 |
| PB11 | R.19 | ... | ... | ... | ... | ... | ... | R.12 |
| PB12 | R.27 | ... | ... | ... | ... | ... | ... | R.20 |
| PB13 | PR | CR | UR | VR | PL | CL | UL | VL |
| PB14 | L.11 | ... | ... | ... | ... | ... | ... | L.4 |
| PB15 | L.19 | ... | ... | ... | ... | ... | ... | L.12 |
| PB16 | L.27 | ... | ... | ... | ... | ... | ... | L.20 |
| PB17 | R.11 | ... | ... | | | | | R.4 |

TABLE 3-continued

3D Audio Sample Packet

| Byte | Bit # | | | | | | | |
|---|---|---|---|---|---|---|---|---|
| | 7 | 6 | 5 | 4 | 3 | 2 | 1 | 0 |
| PB18 | R.19 | ... | ... | ... | ... | ... | ... | R.12 |
| PB19 | R.27 | ... | ... | ... | ... | ... | ... | R.20 |
| PB20 | PR | CR | UR | VR | PL | CL | UL | VL |
| PB21 | L.11 | ... | ... | ... | ... | ... | ... | L.4 |
| PB22 | L.19 | ... | ... | ... | ... | ... | ... | L.12 |
| PB23 | L.27 | ... | ... | ... | ... | ... | ... | L.20 |
| PB24 | R.11 | ... | ... | | | | | R.4 |
| PB25 | R.19 | ... | ... | ... | ... | ... | ... | R.12 |
| PB26 | R.27 | ... | ... | ... | ... | ... | ... | R.20 |
| PB27 | PR | CR | UR | VR | PL | CL | UL | VL |

Multi-Audio Sample Packet

A Multi-Audio Sample Packet includes four Audio Samples where each Audio Sample is associated with an independent audio stream. When a MHL Source device transmits more than four independent audio streams simultaneously, these consecutive audio streams are transmitted by a series of continuous Multi-Audio Sample Packets. The sequence number defined in the packet header identifies each Multi-Audio Sample Packet and indicates the order of the current packet within the array of packets. The configuration of the subpackets is determined by the sequence number and the sample present bits in the header. This is described in detail in the Multi-Audio Data Packetization section below.

For each subpacket (or audio stream), a descriptor field in the Multi-Audio Metadata Packet describes the viewing mode (i.e., single view or Multi-View) and optional information (e.g., Split-Screen tagging, language code, audio for the visually impaired, etc.) These will be described in detail below.

The sequence number field (sequence_number) indicates the sequence number of the current Multi-Audio Sample Packet when there are more than four audio streams to transmit from Source to MHL Sink. If the sequence number field is set to 0, the packet may include the first four audio streams in the corresponding subpackets, respectively. If the sequence number field is set to 1, the packet may include the second set of four audio streams in the corresponding subpackets, respectively. In a similar way, the packet includes third or fourth sets of four audio streams when the sequence number field is set to 2 or 3, respectively. The audio stream carried in Subpacket 0 where sequence_number=0 may be designated as the default audio stream.

The stream present field (stream_present.spX) indicates if subpacket X contains an audio sample(s) of stream X.

The stream flat field (stream_flat.spX) indicates if subpacket X represents a "flatline" sample of stream X. The stream flat field may be valid only if "stream_present.spX" is also set.

Other header fields and Subpacket structures are identical or similar to the Audio Sample Packet shown in MHL 2.0 specification.

TABLE 4

Multi-Audio Sample Packet

| Byte | Bit # | | | | | | | |
|---|---|---|---|---|---|---|---|---|
| | 7 | 6 | 5 | 4 | 3 | 2 | 1 | 0 |
| HB0 | 0 | 0 | 0 | 0 | 0 | 1 | 0 | 1 |
| HB1 | 0 | 0 | sequence_number | | stream present.sp3 | stream present.sp2 | stream present.sp1 | stream present.sp0 |
| HB2 | B.3 | B.2 | B.1 | B.0 | stream flat.sp3 | stream flat.sp2 | stream flat.sp1 | stream flat.sp0 |
| PB0~PB6 | Audio sample data for audio stream N + 0 | | | | | | | |
| PB7~PB13 | Audio sample data for audio stream N + 1 | | | | | | | |
| PB14~PB20 | Audio sample data for audio stream N + 2 | | | | | | | |
| PB21~PB27 | Audio sample data for audio stream N + 3 | | | | | | | |

FIG. 4 is a view illustrating a state where a payload of a multi-audio sample packet is being transmitted, according to an exemplary embodiment.

As illustrated in FIG. 4, when 4 multi-audio sample packets are transmitted, 16 audio steams may be delivered. As the sequence number consists of 2 bits, as many as 16 audio streams may be delivered.

Figure 5:
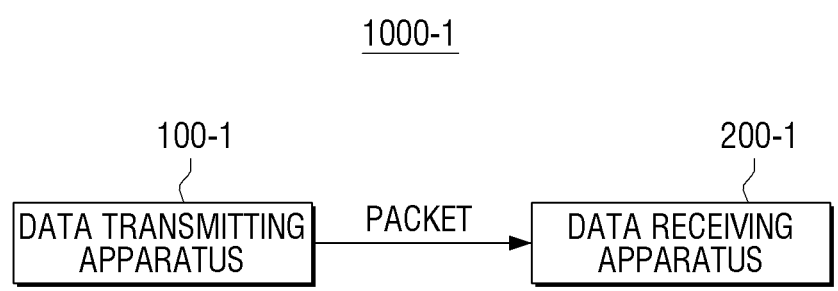
FIG. 5 is a block diagram illustrating a data transceiving system according to an exemplary embodiment.

FIG. 5 is a block diagram illustrating a data transceiving system 1000-1 according to an exemplary embodiment.

Referring to FIG. 5, the data transceiving system 1000-1 according to an exemplary embodiment includes a data transmitting apparatus 100-1 and a data receiving apparatus 200-1.

The data transmitting apparatus 100-1 generates a plurality of sub packets regarding a multi-audio stream and transmits the plurality of sub packets to the data receiving apparatus 200-1.

A header of a transmitted packet includes a sequence number field for identifying an order of the generated packet among all packets.

Figure 6:
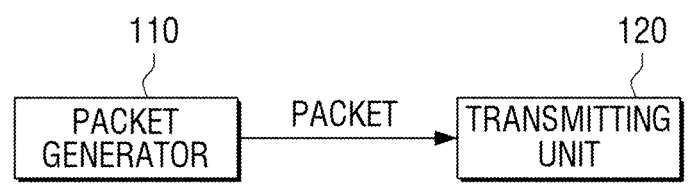
FIG. 6 is a block diagram illustrating a data transmitting apparatus according to an exemplary embodiment.

FIG. 6 is a block diagram illustrating a data transmitting apparatus 100-1 according to an exemplary embodiment.

Referring to FIG. 6, the data transmitting apparatus 100-1 according to an exemplary embodiment includes a packet generator 110 and a transmitting unit 120 (e.g., transmitter).

The packet generator 110 generates a packet including a plurality of sub packets regarding a multi-audio stream. As described in the above exemplary embodiment, one packet may include four sub packets corresponding to four audio streams.

In this case, a header of the generated packet includes a sequence number field for identifying an order of the generated packet among all packets. As shown in the exemplary embodiment of FIG. 4, the sequence number field represents the order of the packets which are transmitted.

The transmitting unit 120 transmits the generated packet to the data receiving apparatus 200-1.

Figure 7:
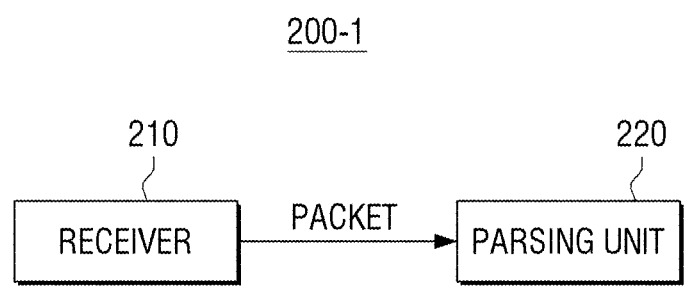
FIG. 7 is a block diagram illustrating a data receiving apparatus according to an exemplary embodiment.

FIG. 7 is a block diagram illustrating a data receiving apparatus 200-1 according to an exemplary embodiment.

Referring to FIG. 7, the data receiving apparatus 200-1 according to an exemplary embodiment includes a receiver 210 and a parsing unit 220 (e.g., parser).

The receiver 210 receives a packet including a plurality of sub packets regarding a multi-audio stream from the data transmitting apparatus 100-1.

The parsing unit 120 parses the received packet. A header of the received packet includes a sequence number field for identifying an order of the generated packet among all packets. As shown in the exemplary embodiment of FIG. 4, the sequence number field represents the order of the packets which are transmitted.

3D Audio Metadata Packet

Ancillary data that describes the active 3D Audio data is transmitted using a 3D Audio Metadata Packet. An MHL Source may always transmit an accurate 3D Audio Metadata Packet at least once every two video fields if the MHL Source is capable of transmitting 3D Audio Sample Packets.

The following table shows the 3D Audio Metadata Packet according to an exemplary embodiment.

TABLE 5

13D Audio Metadata Packet

| Byte | Bit # | | | | | | | |
|---|---|---|---|---|---|---|---|---|
| | 7 | 6 | 5 | 4 | 3 | 2 | 1 | 0 |
| HB0 | 0 | 0 | 0 | 0 | 0 | 1 | 1 | 1 |
| HB1 | 0 | 0 | 0 | 0 | 0 | 0 | 0 | 0 |
| HB2 | 0 | 0 | 0 | 0 | 0 | 0 | 0 | 0 |
| PB0 | 0 | 0 | 0 | 3D_CC | | | | |
| PB1 | 0 | 0 | 0 | 0 | 3D_CAST | | | |
| PB2 | 3D_CA | | | | | | | |
| PB3~PB27 | Reserved | | | | | | | |

TABLE 6

3D_CC (3D Audio Channel Count) field

| 3D_CC [4:0] | Audio Channel Count |
|---|---|
| 0b00000 | Refer to Stream Header |
| 0b00001 | 9 channels |
| 0b00010 | 10 channels |
| ... | ... |
| 0b11000 | 32 channels |
| 0b11001~0b11111 | Reserved |

TABLE 7

3D_CAST (3D Audio Channel Allocation Standard Type) field

| 3D_CAST [3:0] | Description |
|---|---|
| 0b0000 | Reserved |
| 0b0001 | Up to 10.2 channels Based on ITU-R BS. 2159-4 (Type B, 10.2 ch) |
| 0b0010 | Up to 22.2 channels Based on SMPTE 2036-2 |
| 0b0011 | Up to 30.2 channels Based on IEC 62574/Ed.1 |
| 0b0100~0b1111 | Reserved |

TABLE 8

3D_CA (3D Audio Channel/Speaker Allocation) field
(3D_CAST = 0x01 (up to 10.2ch))

| 3D_CA | Channel Number | | | | | | | | | | | |
|---|---|---|---|---|---|---|---|---|---|---|---|---|
| (hex) | 12 | 11 | 10 | 9 | 8 | 7 | 6 | 5 | 4 | 3 | 2 | 1 |
| 0x00 | TpFC | LFE2 | TpFR | TpFL | BR | BL | RS | LS | FC | LFE1 | FR | FL |
| 0x01 | Reserved | | | | | | | | | | | |
| ... | | | | | | | | | | | | |
| 0xFF | | | | | | | | | | | | |

TABLE 9

3D_CA (3D Audio Channel/Speaker Allocation) field (3D_CAST = 0x02 (up to 22.2ch))

| 3D_CA | Channel Number | | | | | | | | | | | |
|---|---|---|---|---|---|---|---|---|---|---|---|---|
| (hex) | 12 | 11 | 10 | 9 | 8 | 7 | 6 | 5 | 4 | 3 | 2 | 1 |
| 0x00 | TpFC | LFE2 | TpFR | TpFL | BR | BL | SiR | SiL | FC | LFE1 | FR | FL |
| 0x01 | TpFC | LFE2 | TpFR | TpFL | BR | BL | SiR | SiL | FC | LFE1 | FR | FL |

TABLE 9-continued

3D_CA (3D Audio Channel/Speaker Allocation) field (3D_CAST = 0x02 (up to 22.2ch))

| | | | | | | | | | | | |
|---|---|---|---|---|---|---|---|---|---|---|---|
| 0x02 ... 0xFF | | | | | Reserved | | | | | | |

| 3D_CA | Channel Number | | | | | | | | | | |
|---|---|---|---|---|---|---|---|---|---|---|---|
| (hex) | 24 | 23 | 22 | 21 | 20 | 19 | 18 | 17 | 16 | 15 | 14 | 13 |
| 0x00 | — | — | — | — | — | — | — | — | — | — | — | — |
| 0x01 | BtFC | BtFR | BtFL | TpC | TpSiR | TpSiL | TpBC | TpBR | TpBL | BC | FRC | FLC |
| 0x02 ... 0xFF | | | | | | Reserved | | | | | | |

TABLE 10

3D_CA (3D Audio Channel/Speaker Allocation) field (3D_CAST = 0x03 (up to 30.2ch))

| 3D_CA | Channel Number | | | | | | | | | | | |
|---|---|---|---|---|---|---|---|---|---|---|---|---|
| (hex) | 12 | 11 | 10 | 9 | 8 | 7 | 6 | 5 | 4 | 3 | 2 | 1 |
| 0x00 | TpFC | LFE2 | TpFR | TpFL | BR | BL | SiR | SiL | FC | LFE1 | FR | FL |
| 0x01 | TpFC | LFE2 | TpFR | TpFL | BR | BL | SiR | SiL | FC | LFE1 | FR | FL |
| 0x02 | TpFC | LFE2 | TpFR | TpFL | BR | BL | SiR | SiL | FC | LFE1 | FR | FL |
| 0x03 ... 0xFF | | | | | | Reserved | | | | | | |

| 3D_CA | Channel Number | | | | | | | | | | | |
|---|---|---|---|---|---|---|---|---|---|---|---|---|
| (hex) | 24 | 23 | 22 | 21 | 20 | 19 | 18 | 17 | 16 | 15 | 14 | 13 |
| 0x00 | — | — | — | — | — | — | — | — | — | — | — | — |
| 0x01 | BtFC | BtFR | BtFL | TpC | TpSiR | TpSiL | TpBC | TpBR | TpBL | BC | FRC | FLC |
| 0x02 | BtFC | BtFR | BtFL | TpC | TpSiR | TpSiL | TpBC | TpBR | TpBL | BC | FRC | FLC |
| 0x03 ... 0xFF | | | | | | Reserved | | | | | | |

| 3D_CA | Channel Number | | | | | | | |
|---|---|---|---|---|---|---|---|---|
| (hex) | 32 | 31 | 30 | 29 | 28 | 27 | 26 | 25 |
| 0x00 | — | — | — | — | — | — | — | — |
| 0x01 | — | — | — | — | — | — | — | — |
| 0x02 | TpRS | TpLS | RSd | LSd | RS | LS | FRW | FLW |
| 0x03 ... 0xFF | | | | Reserved | | | | |

Multi-Audio Metadata Packet

Ancillary data that describes the active Multi-Audio stream is transmitted using a Multi-Audio Metadata Packet. The Multi-Audio Metadata Packet is used to describe the view type and auxiliary audio options for each audio stream that is transported in the Multi-Audio Sample Packets.

An MHL Source may always transmit an accurate Multi Stream Audio Metadata Packet at least once every two video fields if the MHL Source is capable of transmitting Multi-Audio Sample Packets.

The following table shows the Multi-Audio Metadata Packet according to an exemplary embodiment.

TABLE 11

Multi-Audio Metadata Packet

| Byte | Bit # | | | | | | | |
|---|---|---|---|---|---|---|---|---|
| | 7 | 6 | 5 | 4 | 3 | 2 | 1 | 0 |
| HB0 | 0 | 0 | 0 | 0 | 1 | 0 | 0 | 0 |
| HB1 | MA_View_Type | | Sequence_Number | | Num_Audio_Streams | | | |
| HB2 | SC_Valid | 000 0000 (or Split_Screen_Config, if SC_Valid = 1) | | | | | | |
| PB0~PB6 | MA_Descriptor_0 | | | | | | | |
| PB7~PB13 | MA_Descriptor_1 | | | | | | | |

TABLE 11-continued

Multi-Audio Metadata Packet

| Byte | Bit # | | | | | | | |
|---|---|---|---|---|---|---|---|---|
| | 7 | 6 | 5 | 4 | 3 | 2 | 1 | 0 |
| PB14~PB20 | MA_Descriptor_2 | | | | | | | |
| PB21~PB27 | MA_Descriptor_3 | | | | | | | |

The view type field (MA_View_Type) indicates the associated viewing mode of Multi-Audio streams such as Single-View or Multi-View.

The sequence number field (Sequence_Number) indicates the packet or sequence number of the current Multi-Audio Metadata Packet. This field is used to identify up to four unique Multi-Audio Metadata Packets. This field uniquely links each Multi-Audio Metadata Packet to a Multi-Audio Sample Packet that has the same Sequence_Number.

The audio stream number field (Num_Audio_Streams) indicates the total number of audio streams transmitted by the Multi-Audio Sample Packets.

The split screen valid field (SC_Valid) relates to split-screen tagging. For example, if the split screen valid field is set to 1, Split-Screen tagging is supported and Split_Screen_Config is specified in the following 7 bits. If the split screen valid field is set to 0, Split-Screen tagging is either not supported or unspecified and the following 7 bits are reserved for other use.

The split screen type field (Split_Screen_Config) indicates the Split-Screen type associated with the audio stream indicated by the current descriptor. The selectable Split-Screen types according to an exemplary embodiment are listed in Table 13 below. This field may be valid only if SC_Valid=1.

The multi-audio descriptor field (MA_Descriptor_X) indicates the characteristics of an audio stream transmitted by Subpacket X of the corresponding Multi-Audio Sample Packet. Table 13 shows a detailed structure of a Multi-Audio Descriptor according to an exemplary embodiment.

TABLE 12

Multi-Audio Type field

| MA_View_Type [1:0] | Description |
|---|---|
| 0b00 | Unspecified or single view mode |
| 0b01 | Multi-View mode |
| 0b10 | Reserved |
| 0b11 | Reserved |

Figure 8A:
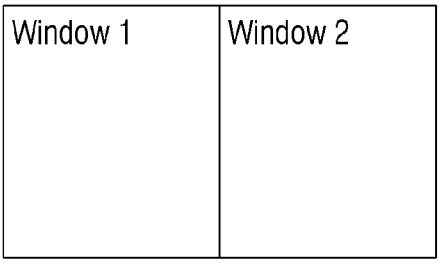
Figure 8A:
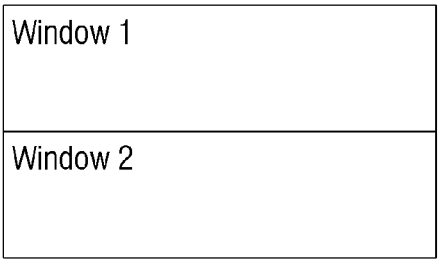
Figure 8A:
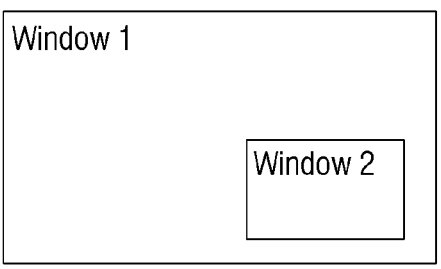
Figure 8A:
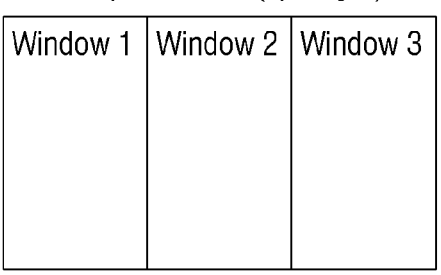

FIGS. 8A, 8B and 8C illustrate split-screen modes associated with an audio stream according to an exemplary embodiment.

The following table shows the Multi-Audio descriptor definition according to an exemplary embodiment.

TABLE 13

Multi-Audio Descriptor

| Byte | Bit # | | | | | | | |
|---|---|---|---|---|---|---|---|---|
| | 7 | 6 | 5 | 4 | 3 | 2 | 1 | 0 |
| PB N + 0 | | Split_Screen_Tag | | | 0 | 0 | Associated_View_ID | |
| PB N + 1 | LC_present | 0 | Mixed_Audio | SAT_present | | Suppl_Audio_Type | | |
| PB N + 2 | Language_Code (3 Bytes) | | | | | | | |
| PB N + 3 | | | | | | | | |
| PB N + 4 | | | | | | | | |
| PB N + 5 | 0 | 0 | 0 | 0 | 0 | 0 | 0 | 0 |
| PB N + 6 | 0 | 0 | 0 | 0 | 0 | 0 | 0 | 0 |

The split screen tag field (Split_Screen_Tag) indicates the specific Window (as defined by Split_Screen_Config) associated with the audio stream indicated by the current Multi-Audio Descriptor. Details of the split screen tag field according to an exemplary embodiment are shown in Table 15 below. The split screen tag field may only be valid if SC_Valid=1, otherwise the MHL Sink can ignore this field.

The associated view identification field (Associated_View_ID) indicates the specific view associated with the audio stream indicated by the current Multi-Audio Descriptor. The meaning of this field is dependent on the value of MA_View_Type. Details of the associated view identification field according to an exemplary embodiment are shown in Table 14 below.

The valid language code field (LC_present) indicates if a valid language code is included. For example, if the valid language code field is set to 1, the current descriptor includes a valid Language_Code field at the following bytes.

The mixed-audio field (Mixed_Audio) indicates whether the corresponding audio stream contains a pre-mixed stream of general audio and supplementary audio. For example, if the mixed-audio field is set to 1, the corresponding audio stream contains a pre-mixed stream of general audio and supplementary audio as indicated by Suppl_Audio_Type.

The SAT present field (SAT_present) indicates if the current descriptor includes a valid supplemental audio type field. For example, if the SAT present field is set to 1, the current descriptor includes a valid Suppl_Audio_Type field at the following 4 bits.

The supplemental audio type field (Suppl_Audio_Type) indicates the type of supplementary audio for the corresponding audio stream. A detailed description of the supplemental audio type field according to an exemplary embodiment is provided below in Table 16. The supplemental audio type field may be valid only if SAT_present=1, otherwise the MHL Sink can ignore this field.

The language code field (Language_Code) indicates the ISO 639-defined language code of the corresponding audio stream. The language code field may be valid only if the LC_present field is set to 1, otherwise the MHL Sink can ignore this field.

TABLE 14

Associated View Identifier field

| MA_View_Type | Associated_View_ID [2:0] | Description |
|---|---|---|
| 0b00 | 0b00 | Unspecified or default view |
| 0b01 | 0b00 | Left stereoscopic picture of 3D field |
|  | 0b01 | Right stereoscopic picture of 3D field |
|  | 0b10~0b11 | Reserved |

TABLE 15

Split-Screen Tag field

| Split_Screen_Tag [3:0] | Description |
|---|---|
| 0b0000 | Window 1 |
| 0b0001 | Window 2 |
| 0b0010 | Window 3 |
| ... | ... |
| 0b1111 | Window 16 |

TABLE 16

Supplementary Audio Feature field

| Suppl_Audio_Type [3:0] | Description |
|---|---|
| 0b0000 | Unspecified or general Audio |
| 0b0001 | Narrated Audio for the visually impaired |
| 0b0010 | Spoken subtitles for the visually impaired |
| 0b0011 | Clean audio for the hearing impaired |
| 0b0100 | Emergency audio channel |
| 0b0101~0b1111 | Reserved |

Figure 9:
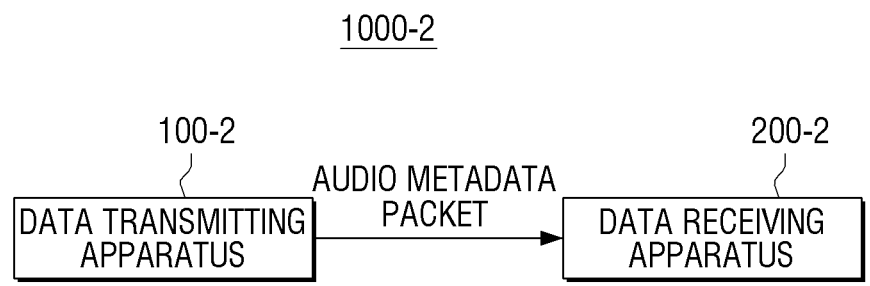
FIG. 9 is a block diagram illustrating a data transceiving system according to another exemplary embodiment.

FIG. 9 is a block diagram illustrating a data transceiving system 1000-2 according to another exemplary embodiment.

Referring to FIG. 9, the data transceiving system 1000-2 according to another exemplary embodiment includes a data transmitting apparatus 100-2 and a data receiving apparatus 200-2.

The data transmitting apparatus 100-2 generates an audio metadata packet and transmits the generated audio metadata packet to the data receiving apparatus 200-2. The audio metadata packet defines a transmitted audio specification.

The data receiving apparatus 100-2 receives the audio metadata packet from the data transmitting apparatus 100-2.

A header of the audio metadata packet includes a split screen information field regarding audio data represented by the audio metadata packet.

Detailed configurations of the data transmitting apparatus 100-2 and the data receiving apparatus 200-2 according to exemplary embodiments will be described below in greater detail.

Figure 10:
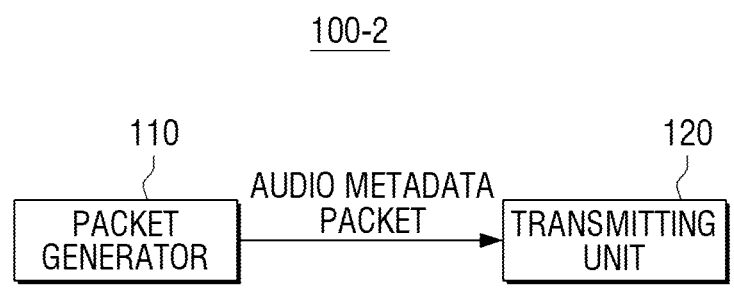
FIG. 10 is a block diagram illustrating a data transmitting apparatus according to another exemplary embodiment.

FIG. 10 is a block diagram illustrating a data transmitting apparatus 100-2 according to another exemplary embodiment.

Referring to FIG. 10, the data transmitting apparatus 100-2 according to another exemplary embodiment includes a packet generator 110 and a transmitting unit 120 (e.g., transmitter).

The packet generator 110 generates an audio metadata packet. The audio metadata packet defines a transmitted audio specification.

In particular, a header of the generated audio metadata packet includes a split screen information field regarding audio data represented by the audio metadata packet.

The transmitting unit 120 transmits the generated audio metadata packet to the data receiving apparatus 200-2.

In this case, the split screen information field may include at least one of a split screen valid field indicating whether a split screen is supported and a split screen type field indicating a type of split screen in relation with transmitted audio data.

The split screen type field may indicate one of a first split mode where a display screen is split horizontally, a second split mode where the display screen is split vertically, a third split mode where a PIP screen is displayed within the display screen, and a fourth split mode where the display screen is split into three or more screens.

The header of the generated audio metadata packet may further include at least one of a view type field indicating whether a transmitted content is a multi-view content or a single-view content, a sequence number field indicating a sequence number of the audio metadata packet, and an audio stream number field indicating information on a number of transmitted audio streams A payload of the generated audio metadata packet may include a multi-audio descriptor field indicating metadata regarding a sub packet of a multi-audio sample packet.

The multi-audio descriptor may include at least one of a split screen tag field indicating split screen information corresponding to audio data represented by the generated audio metadata packet, an associated view ID field indicating a view corresponding to audio data represented by the generated audio metadata packet, a valid language code field indicating whether the multi-audio descriptor field includes a valid language code, a mixed audio field indicating whether main audio data and supplemental audio data is pre-mixed, an SAT present field indicating whether the multi-audio descriptor field includes information regarding a type of valid supplemental audio data, a supplemental audio type field indicating a type of supplemental audio data for audio data represented by the generated audio metadata packet, and a language code field indicating a language code defined ISO639 of audio data represented by the generated audio metadata packet.

Figure 11:
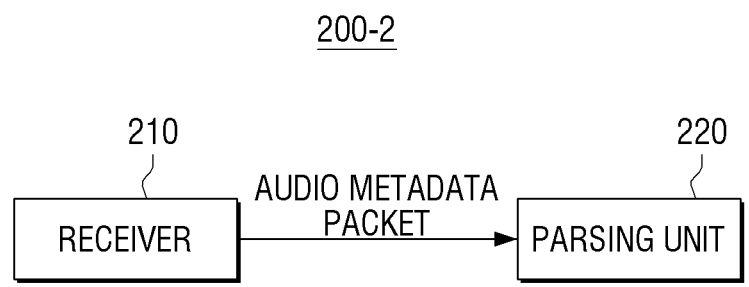
FIG. 11 is a block diagram illustrating a data receiving apparatus according to another exemplary embodiment.

FIG. 11 is a block diagram illustrating a data receiving apparatus 200-2 according to another exemplary embodiment.

Referring to FIG. 11, the data receiving apparatus 200-2 according to another exemplary embodiment includes a receiver 210 and a parsing unit 220 (e.g., parser).

The receiver 210 receives an audio metadata packet from the data transmitting apparatus 100-2. The audio metadata packet defines a received audio specification.

In particular, a header of the audio metadata packet includes a split screen information field regarding audio data represented by the audio metadata packet.

The receiver 210 receives the audio metadata packet from the data transmitting apparatus 100-2.

In this case, the split screen information field may include at least one of a split screen valid field indicating whether a split screen is supported and a split screen type field indicating a type of split screen in relation with transmitted audio data.

The split screen type field may indicate one of a first split mode where a display screen is split horizontally, a second split mode where the display screen is split vertically, a third split mode where a PIP screen is displayed within the display screen, and a fourth split mode where the display screen is split into three or more screens.

The header of the audio metadata packet may further include at least one of a view type field indicating whether a transmitted content is a multi-view content or a single-view content, a sequence number field indicating a sequence number of the audio metadata packet, and an audio stream number field indicating information on a number of transmitted audio streams A payload of the audio metadata packet may include a multi-audio descriptor field indicating metadata regarding a sub packet of a multi-audio sample packet.

The multi-audio descriptor may include at least one of a split screen tag field indicating split screen information corresponding to audio data represented by the generated audio metadata packet, an associated view ID field indicating a view corresponding to audio data represented by the generated audio metadata packet, a valid language code field indicating whether the multi-audio descriptor field includes a valid language code, a mixed audio field indicating whether main audio data and supplemental audio data is pre-mixed, an SAT present field indicating whether the multi-audio descriptor field includes information regarding a type of valid supplemental audio data, a supplemental audio type field indicating a type of supplemental audio data for audio data represented by the generated audio metadata packet, and a language code field indicating a language code defined ISO639 of audio data represented by the generated audio metadata packet.

Active Multi-Audio Mobile Indicator

The Source device may use a Vendor-Specific InfoFrame (VSIF) to indicate to the Sink device the exact viewing mode that is being transmitted. The VSIF may be structured as shown in Table 17 according to an exemplary embodiment.

TABLE 17

| | Vendor-Specific InfoFrame Packet | | | | | | | |
|---|---|---|---|---|---|---|---|---|
| | Bit # | | | | | | | |
| Byte | 7 | 6 | 5 | 4 | 3 | 2 | 1 | 0 |
| HB0 | InfoFrame_Type = 0x81 | | | | | | | |
| HB1 | InfoFrame_version = 0x01 | | | | | | | |
| HB2 | 0 | 0 | 0 | InfoFrame_length | | | | |
| PB0 | Checksum | | | | | | | |
| PB1 | 24-bit IEEE-assigned Organizationally Unique Identifier (OUI) | | | | | | | |
| PB2 | 0x7CA61D | | | | | | | |
| PB3 | | | | | | | | |
| PB4 | Reserved | | MHL_3D_FMT_TYPE | | | MHL_VID_FMT | | |
| PB5 | TBD? (for High-End Video Mode) | | | | | | | |
| PB6 | 0 | 0 | 0 | 0 | 0 | MHL_MULTI_VIEW | | |
| PB7 . . . | Reserved | | | | | | | |
| PB26 | | | | | | | | |
| PB27 | Reserved | | | | | | | |

MHL_MULTI_VIEW indicates which Multi-View mode is being transmitted. A detailed description of MHL_MULTI_VIEW according to an exemplary embodiment is shown in Table 18.

TABLE 18

| MHL_MULTI_VIEW field | |
|---|---|
| MHL_MULTI_VIEW [2:0] | Description |
| 0b000 | Unspecified or Single-View mode |
| 0b001 | Dual-View mode |
| 0b010 | Triple-View mode |
| 0b011 | Quad-View mode |
| 0b100~0b111 | Reserved |

Video

3D Video Descriptor for 3D Support

TABLE 19

| | 3D Video Descriptor Data Structure | | | | | | | |
|---|---|---|---|---|---|---|---|---|
| | Bit | | | | | | | |
| | 7 | 6 | 5 | 4 | 3 | 2 | 1 | 0 |
| VDI_L | Reserved | | | | MV_SUPP | LR_SUPP | TB_SUPP | FS_SUPP |
| VDI_H | Reserved | | | | | | | |

Each supported 3D video mode may be indicated in one 3D Video Descriptor according to an exemplary embodiment.

MV_SUPP: If set to '1', Device supports using the 3D Video Formats for Multi-View video streaming.

Audio

Channel/Speaker Assignment

In cases where an MHL Sink is capable of receiving 3D Audio, the 3D Channel Speaker Allocation Descriptor described in Tables 38 to 40 below may be used for indicating the configuration of the attached speakers. Indication of the current speaker assignment for 3D Audio transmitted from an MHL Source is carried in the 3D_CA field of the 3D Audio Metadata Packet. Refer to Tables 27 to 29 for details of the 3D_CA fields.

3D Audio Data Packetization

Each Subpacket of a 3D Audio Sample Packet may contain zero or one frame of an IEC 60958. If an MHL Source is to down mix the 3D Audio stream and the down-mixed audio streams are also 3D Audio streams, then the audio streams shall be carried using 3D Audio Sample Packets as well. If an MHL Sink does not support a 3D Audio feature, an MHL Source may not transmit 3D Audio Sample Packets in addition to 3D Audio Metadata Packets.

Depending on the number of channels, a number of different Subpacket layouts exist. Table 20 to Table 223 below show the 3D Audio Packet Layouts when transmitting 12, 24, or 32 channels, respectively, according to one or more exemplary embodiments.

TABLE 20

3D Audio Sample Packet Layout for 12 channels

| Packet # | sequence number | Num Channels | Sample | Subpkt 0 | Subpkt 1 | Subpkt 2 | Subpkt 3 |
|---|---|---|---|---|---|---|---|
| 0 | 0 | 12 | 1 | Chnl 1, 2 (Sample 0) | Chnl 3, 4 (Sample 0) | Chnl 5, 6 (Sample 0) | Chnl 7, 8 (Sample 0) |
| 1 | 1 | | | Chnl 9, 10 (Sample 0) | Chnl 11, 12 (Sample 0) | Empty | Empty |

TABLE 21

3D Audio Sample Packet Layout for 24 channels

| Packet # | sequence number | Num Channels | Sample | Subpkt 0 | Subpkt 1 | Subpkt 2 | Subpkt 3 |
|---|---|---|---|---|---|---|---|
| 0 | 0 | 24 | 1 | Chnl 1, 2 (Sample 0) | Chnl 3, 4 (Sample 0) | Chnl 5, 6 (Sample 0) | Chnl 7, 8 (Sample 0) |
| 1 | 1 | | | Chnl 9, 10 (Sample 0) | Chnl 11, 12 (Sample 0) | Chnl 13, 14 (Sample 0) | Chnl 15, 16 (Sample 0) |
| 2 | 2 | | | Chnl 17, 18 (Sample 0) | Chnl 19, 20 (Sample 0) | Chnl 21, 22 (Sample 0) | Chnl 23, 24 (Sample 0) |

TABLE 22

3D Audio Sample Packet Layout for 32 channels

| Packet # | sequence number | Num Channels | Sample | Subpkt 0 | Subpkt 1 | Subpkt 2 | Subpkt 3 |
|---|---|---|---|---|---|---|---|
| 0 | 0 | 32 (Max) | 1 | Chnl 1, 2 (Sample 0) | Chnl 3, 4 (Sample 0) | Chnl 5, 6 (Sample 0) | Chnl 7, 8 (Sample 0) |
| 1 | 1 | | | Chnl 9, 10 (Sample 0) | Chnl 11, 12 (Sample 0) | Chnl 13, 14 (Sample 0) | Chnl 15, 16 (Sample 0) |
| 2 | 2 | | | Chnl 17, 18 (Sample 0) | Chnl 19, 20 (Sample 0) | Chnl 21, 22 (Sample 0) | Chnl 23, 24 (Sample 0) |
| 3 | 3 | | | Chnl 25, 26 (Sample 0) | Chnl 27, 28 (Sample 0) | Chnl 29, 30 (Sample 0) | Chnl 31, 32 (Sample 0) |

There are four sample_present bits in the 3D Audio Sample Packet Header, one for each of the subpackets. Each indicates that one subpacket contains a 3D Audio sample. In addition, there are four sample_flat.spX bits which are set if no useful audio data was available at the MHL Source during the time period represented by that sample. This may occur during sample rate changes or temporary stream interruptions.

Contiguous 3D Audio Sample Packets can be used to carry one 3D Audio sample which contains between 9 and 32 channels of L-PCM audio (i.e., 5 to 16 IEC 60958 frames).

The first packet of a 3D Audio sample is fully packed with 8 audio channels and has the sequence number field set to 0. A sequence number increments by one for each additional packet within the same 3D Audio sample. The final packet contains 8 or fewer audio channels depending on the total number of channels of a 3D Audio sample.

There may be only five valid configurations of sample_present bits for a 3D Audio Sample Packet.

TABLE 23

Valid Sample_Present Bit Configurations for 3D Audio transmission

| SP0 | SP1 | SP1 | SP3 | Description |
| --- | --- | --- | --- | --- |
| 0 | 0 | 0 | 0 | No Subpackets contain parts of the audio sample. |
| 1 | 0 | 0 | 0 | Only Subpacket 0 contains one part of the audio sample. |
| 1 | 1 | 0 | 0 | Subpackets 0 and 1 contain two contiguous parts of the audio sample. |
| 1 | 1 | 1 | 0 | Subpackets 0, 1 and 2 contain three contiguous parts of the audio sample. |
| 1 | 1 | 1 | 1 | Subpackets 0, 1, 2 and 3 contain four contiguous parts of the audio sample. |

FIGS. 10 and 11 are views illustrating a transmission timing of a 3D audio signal.

FIGS. 10 and 11 illustrate that three 8-channel 2D audio signal samples are transmitted in a horizontal blanking interval. The 3D audio signal of 24 channels transmits one sample during the same period of time.

Multi-Audio Data Packetization

MHL allows an MHL Source to concurrently transmit a number of audio streams for single AV Streaming. The multiple audio streams are associated with either a single view or Multi-View video streaming (e.g., dual-view gaming with different audio streams per view). Auxiliary audio modes may also be indicated, such as Split-Screen tagging (i.e., different parts of the screen are tagged and associated with their own audio stream), language codes, or audio for visually/hearing impaired. Each audio stream can be associated with only one viewing mode and contain 2 audio channels at most.

Each Subpacket of a Multi-Stream Audio Sample Packet can contain zero or one IEC 60958-defined "frames" of an IEC 60958 or IEC 61937 "block".

When there are more than four audio streams to be transmitted, two or more continuous Multi-Audio Sample Packets are used to transmit the multiple audio streams. The order of each packet within the packet array is identified by the Sequence_Number field. An MHL Source can transmit up to 16 independent audio streams simultaneously within a single AV Stream.

Tables 24 and 25 show examples of Multi-Audio Sample Packet and Multi-Audio Metadata Packet layouts when an MHL Source transmits four audio streams with Single-View video streaming, according to one or more exemplary embodiments. Multi-Audio Metadata Packet describes the characteristics (e.g., supplementary information, language, etc.) of each audio stream.

Tables 26 and 27 show examples of Multi-Audio Sample Packet and Multi-Audio Metadata Packet layouts when an MHL Source transmits eight audio streams with dual view video streaming. A Multi-Audio Metadata Packet describes the characteristics (e.g., associated view, supplementary information, language, etc.) of each audio stream.

Tables 28 and 29 show examples of Multi-Audio Sample Packet and Multi-Audio Metadata Packet layouts when an MHL Source transmits six audio streams with Split-Screen tagging option enabled for single view video streaming, according to one or more exemplary embodiments.

TABLE 24

Example of Multi-Audio Sample Packet Layout with 4 audio streams in single view mode

| Packet # | sequence number | Num Streams | Subpkt 0 | Subpkt 1 | Subpkt 2 | Subpkt 3 |
|---|---|---|---|---|---|---|
| 0 | 0 | 4 | Stream 1 (Channel 1, 2) | Stream 2 (Channel 1, 2) | Stream 3 (Channel 1, 2) | Stream 4 (Channel 1, 2) |

TABLE 25

Example of Multi-Audio Metadata Packet Layout (related to the packet in Table 24)

| Packet # | sequence number | Num Streams | Subpkt 0 | Subpkt 1 | Subpkt 2 | Subpkt 3 |
|---|---|---|---|---|---|---|
| 0 | 0 | 4 | English nomal | Korean normal | Japanese Audio for VI | Spanish Audio for HI |

Audio for HI: Audio stream for Hearing Impaired
Audio for VI: Audio stream for Visually Impaired

TABLE 26

Example of Multi-Audio Sample Packet Layout with 8 audio streams in dual view mode

| Packet # | sequence number | Num Streams | Subpkt 0 | Subpkt 1 | Subpkt 2 | Subpkt 3 |
|---|---|---|---|---|---|---|
| 0 | 0 | 8 | Stream 1 (Channel 1, 2) | Stream 2 (Channel 1, 2) | Stream 3 (Channel 1, 2) | Stream 4 (Channel 1, 2) |
| 1 | 1 |   | Stream 5 (Channel 1, 2) | Stream 6 (Channel 1, 2) | Stream 7 (Channel 1, 2) | Stream 8 (Channel 1, 2) |

TABLE 27

Example of Multi-Audio Metadata Packet Layout (related to the packet in Table 26)

| Packet # | sequence number | Num Streams | Subpkt 0 | Subpkt 1 | Subpkt 2 | Subpkt 3 |
|---|---|---|---|---|---|---|
| 0 | 0 | 8 | Left View English nomal | Left View Korean normal | Left View Spanish normal | Left View Spanish Audio for HI |
| 1 | 1 |   | Left View English Audio for VI | Right View Koean Audio for VI | Right View Japanese Audio for VI | Right View Chinese Audio for VI |

Audio for HI: Audio stream for Hearing Impaired
Audio for VI: Audio stream for Visually Impaired

TABLE 28

Example of Multi-Audio Sample Packet Layout with 6 audio streams with Split-Screen tagging (in single view) mode

| Packet # | sequence number | Num Streams | Subpkt 0 | Subpkt 1 | Subpkt 2 | Subpkt 3 |
|---|---|---|---|---|---|---|
| 0 | 0 | 6 | Stream 1 (Channel 1, 2) | Stream 2 (Channel 1, 2) | Stream 3 (Channel 1, 2) | Stream 4 (Channel 1, 2) |
| 1 | 1 |   | Stream 5 (Channel 1, 2) | Stream 6 (Channel 1, 2) | — | — |

TABLE 29

Example of Multi-Audio Metadata Packet Layout (related to the packet in Table 28)

| Packet # | sequence number | Num Streams | Subpkt 0 | Subpkt 1 | Subpkt 2 | Subpkt 3 |
|---|---|---|---|---|---|---|
| 0 | 0 | 6 | Window 1 English normal | Window 2 Korean normal | Window 3 Spanish normal | Window 4 Japanese normal |
| 1 | 1 |  | Window 5 English Audio for HI | Window 6 English Audio for VI | — | — |

Audio for HI: Audio stream for Hearing Impaired
Audio for VI: Audio stream for Visually Impaired 3D Audio Metadata Packetization Whenever an active 3D Audio stream is being transmitted, an accurate 3D Audio Metadata Packet may be transmitted at least once per two Video Fields.

Upon the start of a new 3D Audio stream or upon any change in the 3D Audio stream that can be indicated by the 3D Audio Metadata Packet and Audio InfoFrame, a modified, accurate 3D Audio Metadata Packet shall be transmitted no later than one video frame following the first affected non-silent audio sample. Preferably, this would occur just before the first affected audio sample is transmitted.

The 3D Audio Metadata Packet transmission may occur at any time within the Data Island period, including any horizontal or vertical blanking periods.

When 3D Audio is streaming, the MHL Sink can ignore CC and CA fields in the Audio InfoFrame and instead refer to 3D_CC and 3D_CA in the 3D Audio Metadata Packets.

Multi-Audio Metadata Packetization

Whenever an active Multi-Audio stream is being transmitted, an accurate Multi-Audio Metadata Packet may be transmitted at least once per two Video Fields.

Upon the start of a new Multi-Audio stream or upon any change in the Multi-Audio stream that can be indicated by the Multi-Audio Metadata Packet and Audio InfoFrame, a modified, accurate Multi-Audio Metadata Packet may be transmitted no later than one video frame following the first affected non-silent audio sample. For example, this would occur just before the first affected audio sample is transmitted.

The Multi-Audio Metadata Packet transmission may occur at any time within the Data Island period, including any horizontal or vertical blanking period.

WRITE_BURST Usage for 3D/Multi-Audio Support

Support for the 3D Audio mode is indicated using a sequence of WRITE_BURST transfers, formatted according to one or more exemplary embodiments as shown in Tables 31 and 37.

TABLE 30

MHL 3D Audio Descriptors (3D_AD) in WRITE_BURST

| Offset | Symbol | Value | Description | Notes |
|---|---|---|---|---|
| 0x00 | BURST_ID_H |  | High-order byte of Burst_ID |  |
| 0x01 | BURST_ID_L |  | Low-order byte of Burst_ID |  |
| 0x02 | CHECK_SUM |  | Checksum for WRITE_BURST |  |
| 0x03 | TOT_DESC |  | Total Descriptors in Sequence |  |
| 0x04 | SEQ |  | Sequence Index |  |
| 0x05 | NUM_DESC |  | Number of Descriptors in this burst |  |
| 0x06 | AUD_DESC 1 |  | Indicates the audio descriptor for 3D Audio |  |
| 0x07 |  |  |  |  |
| 0x08 |  |  |  |  |
| 0x09 |  |  |  |  |
| 0x0A | AUD_DESC 2 |  | Indicates the audio descriptor for 3D Audio |  |
| 0x0B |  |  |  |  |
| 0x0C |  |  |  |  |
| 0x0D |  |  |  |  |
| 0x0E | TBD |  | TBD |  |
| 0x0F | TBD |  | TBD |  |

TABLE 31

Audio Descriptor for Audio Format Code = 1 (LPCM)

| Byte | Bit # | | | | | | | |
|---|---|---|---|---|---|---|---|---|
| | 7 | 6 | 5 | 4 | 3 | 2 | 1 | 0 |
| 1 | 0 | 0 | 0 | 0 | \multicolumn{4}{c}{Audio Format Code = 0001b} |
| 2 | 0 | 0 | 0 |  | \multicolumn{4}{c}{Max Number of channels − 1} |
| 3 | 0 | 192 kHz | 176.4 kHz | 96 kHz | 88.2 kHz | 48 kHz | 44.1 kHz | 32 kHz |
| 4 | 0 | 0 | 0 | 0 | 0 | 24 bit | 20 bit | 16 bit |

TABLE 32

Audio Descriptor for Audio Format Codes 2 to 8

| Byte | Bit # 7 | 6 | 5 | 4 | 3 | 2 | 1 | 0 |
|---|---|---|---|---|---|---|---|---|
| 1 | 0 | 0 | 0 | 0 | Audio Format Code | | | |
| 2 | 0 | 0 | 0 | Max Number of channels − 1 | | | | |
| 3 | 0 | 192 kHz | 176.4 kHz | 96 kHz | 88.2 kHz | 48 kHz | 44.1 kHz | 32 kHz |
| 4 | Maximum bit rate divided by 8 kHz | | | | | | | |

TABLE 33

3D Audio Descriptor for Audio Format Codes 9 to 13

| Byte | Bit # 7 | 6 | 5 | 4 | 3 | 2 | 1 | 0 |
|---|---|---|---|---|---|---|---|---|
| 1 | 0 | 0 | 0 | 0 | Audio Format Code | | | |
| 2 | 0 | 0 | 0 | Max Number of channels − 1 | | | | |
| 3 | 0 | 192 kHz | 176.4 kHz | 96 kHz | 88.2 kHz | 48 kHz | 44.1 kHz | 32 kHz |
| 4 | Audio Format Code dependent value | | | | | | | |

TABLE 34

3D Audio Descriptor for Audio Format Code 14 (WMA Pro)

| Byte | Bit # 7 | 6 | 5 | 4 | 3 | 2 | 1 | 0 |
|---|---|---|---|---|---|---|---|---|
| 1 | 0 | 0 | 0 | 0 | Audio Format Code = 1110b | | | |
| 2 | 0 | 0 | 0 | Max Number of channels − 1 | | | | |
| 3 | 0 | 192 kHz | 176.4 kHz | 96 kHz | 88.2 kHz | 48 kH | 44.1 kHz | 32 kHz |
| 4 | Reserved (0) | | | | Profile | | | |

TABLE 35

3D Audio Descriptor for Audio Format Code 15 (extension)

| Byte | Bit # 7 | 6 | 5 | 4 | 3 | 2 | 1 | 0 |
|---|---|---|---|---|---|---|---|---|
| 1 | 0 | 0 | 0 | 0 | Audio Format Code = 1111b | | | |
| 2 | 0 | 0 | 0 | Max Number of channels − 1 | | | | |
| 3 | 0 | 192 kHz | 176.4 kHz | 96 kHz | 88.2 kHz | 48 kHz | 44.1 kHz | 32 kHz |
| 4 | Audio Format Code Extension | | | | | 0 | 0 | 0 |

TABLE 36

MHL 3D Channel/Speaker Allocation Descriptor (3D_CSAD) in WRITE_BURST

| Offset | Symbol | Value | Description | Notes |
|---|---|---|---|---|
| 0x00 | BURST_ID_H | | High-order byte of Burst_ID | |
| 0x01 | BURST_ID_L | | Low-order byte of Burst_ID | |
| 0x02 | CHECK_SUM | | Checksum for WRITE_BURST | |
| 0x03 | CSA_DESC | | Indicates the channel/speaker allocation descriptor for 3D Audio | |
| 0x04 | | | | |
| 0x05 | | | | |
| 0x06 | | | | |
| 0x07 | TBD | | TBD | |
| 0x08 | TBD | | TBD | |
| 0x09 | TBD | | TBD | |
| 0x0A | TBD | | TBD | |
| 0x0B | TBD | | TBD | |
| 0x0C | TBD | | TBD | |
| 0x0D | TBD | | TBD | |
| 0x0E | TBD | | TBD | |
| 0x0F | TBD | | TBD | |

TABLE 37

3D Channel Speaker Allocation Descriptor for 10.2 channels

| Byte | Bit # | | | | | | | |
|---|---|---|---|---|---|---|---|---|
| | 7 | 6 | 5 | 4 | 3 | 2 | 1 | 0 |
| PB1 | FLW/ FRW | BLC/ BRC | FLC/ FRC | BC | BL/ BR | FC | LFE1 | FL/ FR |
| PB2 | TpSiL/ TpSiR | SiL/ SiR | TpBC | LFE2 | LS/ RS | TpFC | TpC | TpFL/ TpFR |
| PB3 | 0 | 0 | 0 | LSd/ LRd | TpLS/ TpRS | BtFL/ BtFR | BtFC | TpBL/ TpBR |
| PB4 | 3D_CAST (=0x01) | | | 0 | 0 | 0 | 0 | 0 |

Bold bits are the designated speakers associated with 10.2 channels.

TABLE 38

3D Channel Speaker Allocation Descriptor for 22.2 channels

| Byte | Bit # | | | | | | | |
|---|---|---|---|---|---|---|---|---|
| | 7 | 6 | 5 | 4 | 3 | 2 | 1 | 0 |
| PB1 | FLW/ FRW | BLC/ BRC | FLC/ FRC | BC | BL/BR | FC | LFE1 | FL/FR |
| PB2 | TpSiL/ TpSiR | SiL/SiR | TpBC | LFE2 | LS/RS | TpFC | TpC | TpFL/ TpFR |
| PB3 | 0 | 0 | 0 | LSd/ LRd | TpLS/ TpRS | BtFL/ BtFR | BtFC | TpBL/ TpBR |
| PB4 | 3D_CAST (=0x02) | | | 0 | 0 | 0 | 0 | 0 |

Bold bits are the designated speakers associated with 22.2 channels.

TABLE 39

3D Channel Speaker Allocation Descriptor for 30.2 channels

| Byte | Bit # | | | | | | | |
|---|---|---|---|---|---|---|---|---|
| | 7 | 6 | 5 | 4 | 3 | 2 | 1 | 0 |
| PB1 | FLW/ FRW | BLC/ BRC | FLC/ FRC | BC | BL/BR | FC | LFE1 | FL/FR |
| PB2 | TpSiL/ TpSiR | SiL/SiR | TpBC | LFE2 | LS/RS | TpFC | TpC | TpFL/ TpFR |
| PB3 | 0 | 0 | 0 | LSd/ LRd | TpLS/ TpRS | BtFL/ BtFR | BtFC | TpBL/ TpBR |
| PB4 | 3D_CAST (=0x03) | | | 0 | 0 | 0 | 0 | 0 |

Bold bits are the designated speakers associated with 30.2 channels.

TABLE 40

3D_CAST (3D Audio Channel Allocation Standard Type) field

| 3D_CAST | Description |
|---|---|
| 0x0 | Reserved |
| 0x1 | Up to 10.2 channels Based on ITU-R BS. 2159-4 (Type B, 10.2ch) |
| 0x2 | Up to 22.2 channels Based on SMPTE 2036-2 |
| 0x3 | Up to 30.2 channels Based on IEC 62574/Ed.1 Reserved |
| 0x4 | |
| ... | Reserved |
| 0xF | |

Link Control Bus
Device Register Change Interrupt

TABLE 41

Register Change Interrupt Register Details

| Register Name<br>RCHANGE_INT | Offset<br>0x20 | 7 | 6 | 5 | 4 | 3 | 2 | 1 | 0 | |
|---|---|---|---|---|---|---|---|---|---|---|
| Bit | Name | Source | Sink | | | | | | | Notes |
| 0 | DCAP_CHG | X | X | ... | | | | | | 1 |
| 1 | DSCR_CHG | X | X | ... | | | | | | 2 |
| 2 | REQ_WRT | X | X | ... | | | | | | 2 |
| 3 | GRT_WRT | X | X | ... | | | | | | 2 |
| 4 | 3D_REQ | X | X | ... | | | | | | 3 |
| 5 | 3D_AUD_REQ | X | X | Request for 3D Audio Information | | | | | | 4 |
| 6-7 | | | | | | | | | | |

3D_AUD_REQ is used by an MHL Source device to request the 3D Audio support information from the MHL Sink.

BURST_ID Codes

TABLE 42

BURST_ID Codes

| Symbol | Value | Description | Notes |
|---|---|---|---|
| 3D_VIC | 0x0010 | Indicates Video Index Codes for 3D | 1 |
| 3D_DTD | 0x0011 | Indicates Detailed Timing Descriptors for 3D | 1 |
| 3D_AD | 0x0101 | Indicates the 3D Audio Descriptors for 3D Audio | 2 |
| 3D_CSAD | 0x0110 | Indicates the 3D Channel/Speaker Allocation Descriptor for 3D Audio | 2 |

3D_AD and 3D_CSAD are used by MHL Sink in indicating support of Audio Extension. See Section 7.XX.

Control and Configuration
Extended Device Capability Register

A sink apparatus may provide an extended device capability register to a source apparatus. In other words, a source apparatus may read out an extended device capability register of a sink apparatus.

As shown in the table below, address 0x85 of an extended device capability register of an MHL specification may be used to represent multi-audio modes supported by a sink apparatus.

TABLE 43

Extended Device Capability Register Name and Definition

| Address | Extended Device Capability Register Name | Definition |
|---|---|---|
| 0x80 | ECBUS_SPEEDS | eCBUS Frequencies |
| 0x81 | TMDS_SPEEDS | TMDS Frequencies |
| 0x82 | ECBUS_TDM_SUPPORTED | Number of supported eCBUS TDM channels. |
| 0x83 | ECBUS_USB_ROLES | Indicates USB roles supported by this device. |
| 0x84 | CABLE_REPORT | Indicates the type of cable detected at Sink. |
| 0x85 | MULTI_AUD_MODE | Indicates the Multi-Audio modes supported by Sink. |

Multi-Audio Mode

Each MHL Sink device may indicate in the MULTI_AUD_MODE register the specific Multi-Audio Mode it supports The MULTI_AUD_MODE register includes a split-screen audio field which indicates whether a sink apparatus supports receiving and processing of multi-audio in relation with split-screen.

TABLE 44

MULTI_AUD_MODE Register Details

| Register Name | | Offset | 7 | 6 | 5 | 4 | 3 | 2 | 1 | 0 |
|---|---|---|---|---|---|---|---|---|---|---|
| | | | | | | | SUPP_<br>AUD_<br>LANG | SUPP_<br>AUD_<br>SUPPL | SUPP_<br>AUD_<br>SPLIT | SUPP_<br>AUD_<br>MV |
| MULTI_AUD_MODE | | 0x85 | Reserved | | | | | | | |
| Bit | Name | | | | | | | | | Notes |
| 0 | SUPP_AUD_MV | Supports Multi-View Multi-Audio mode | | | | | | | | 1 |
| 1 | SUPP_AUD_SC | Supports Split-Screen tagging | | | | | | | | |
| 2 | SUPP_AUD_SUPPL | Supports Supplementary Audio mode (e.g., audio for visually/hearing impaired) | | | | | | | | |
| 3 | SUPP_AUD_LANG | Supports Multi-language Audio | | | | | | | | |
| 7:4 | | Reserved | | | | | | | | |

If a device is not capable of supporting Multi-View video streaming, this field may be set to 0.

Figure 14:
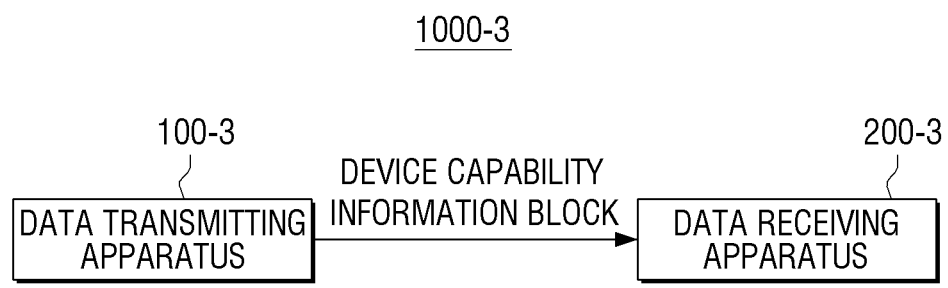
FIG. 14 is a block diagram illustrating a data transceiving system according to still another exemplary embodiment.

FIG. 14 is a block diagram illustrating a data transceiving system 1000-3 according to still another exemplary embodiment.

Referring to FIG. 14, the data transceiving system 1000-3 according to the present exemplary embodiment includes a data transmitting apparatus 100-3 and a data receiving apparatus 200-3.

The data transmitting apparatus 100-3 transmits a device capability information block including information on properties supported by a sink apparatus regarding audio data to the data receiving apparatus 200-3.

Figure 15:
FIG. 15 is a block diagram illustrating a configuration of a data transmitting apparatus according to still another exemplary embodiment.

FIG. 15 is a block diagram illustrating a configuration of a data transmitting apparatus 100-3 according to still another exemplary embodiment.

Referring to FIG. 15, the data transmitting apparatus 100-3 according to the present exemplary embodiment includes a generator 130 and a transmitting unit 120 (e.g., transmitter).

The generator 130 generates a device capability information block including information on properties supported by a sink apparatus regarding audio data.

The device capability information block may include a split screen audio field indicating whether the sink apparatus supports receiving and processing of multi-audio regarding split screen.

The transmitting unit 120 transmits the device capability information block to the data receiving apparatus 200-3.

Figure 16:
FIG. 16 is a block diagram illustrating a configuration of a data receiving apparatus according to still another exemplary embodiment.

FIG. 16 is a block diagram illustrating a configuration of a data receiving apparatus 200-3 according to still another exemplary embodiment.

Referring to FIG. 16, the data receiving apparatus 200-3 according to the present exemplary embodiment includes a receiver 210 and an analyzing unit 230 (e.g., analyzer).

The receiver 210 receives the device capability information block from the data transmitting apparatus 100-3.

The analyzing unit 230 analyzes the received device capability information block.

The device capability information block includes information on properties supported by a sink apparatus regarding audio data. Specifically, the device capability information block may include a split screen audio field indicating whether the sink apparatus supports receiving and processing of multi-audio regarding split screen.

Multi-Stream Audio

Hereinafter, multi-stream audio will be described according to various exemplary embodiments. The multi-stream audio transmission specification described below may be applied to various wired/wireless transmission interfaces including HDMI and MHL.

A source apparatus according to an exemplary embodiment may transmit 4 audio streams simultaneously. All audio streams share one InfoFrame with respect to a multi-stream audio sample packet.

A wired interface according to various exemplary embodiments may add support for single-view video streaming (for example, multi-lingual support, audio for visually/hearing impaired, etc.), which may be performed by modifying an audio metadata packet or modifying a HDMI audio data block.

For example, as shown in Table 45 below, multi-stream audio may support multi-languages, and the audio may be supported in 2 channels.

TABLE 45

| Overview of Supports of Multi-stream Audio for single view | | | | | |
|---|---|---|---|---|---|
| Audio Feature | Application | Audio Ch. | Feature Req. | Metadata | Notes |
| 3D Audio | UHD 4k, cinema | 9~32ch. | Optional | Speaker Alloc. | |
| Multi-stream Audio (multi-view) | Dual-view gaming | Max. 2ch. | Optional | Video(field) mapping | Max. 4 streams |
| Multi-stream Audio (single-view) | Multi-lingual support Video(Audio) Description | Max. 2ch. Max. 2ch. | Optional Optional | Language code Indicator | Max. 4 streams Max. 4 streams |

Scenarios

Figure 17:
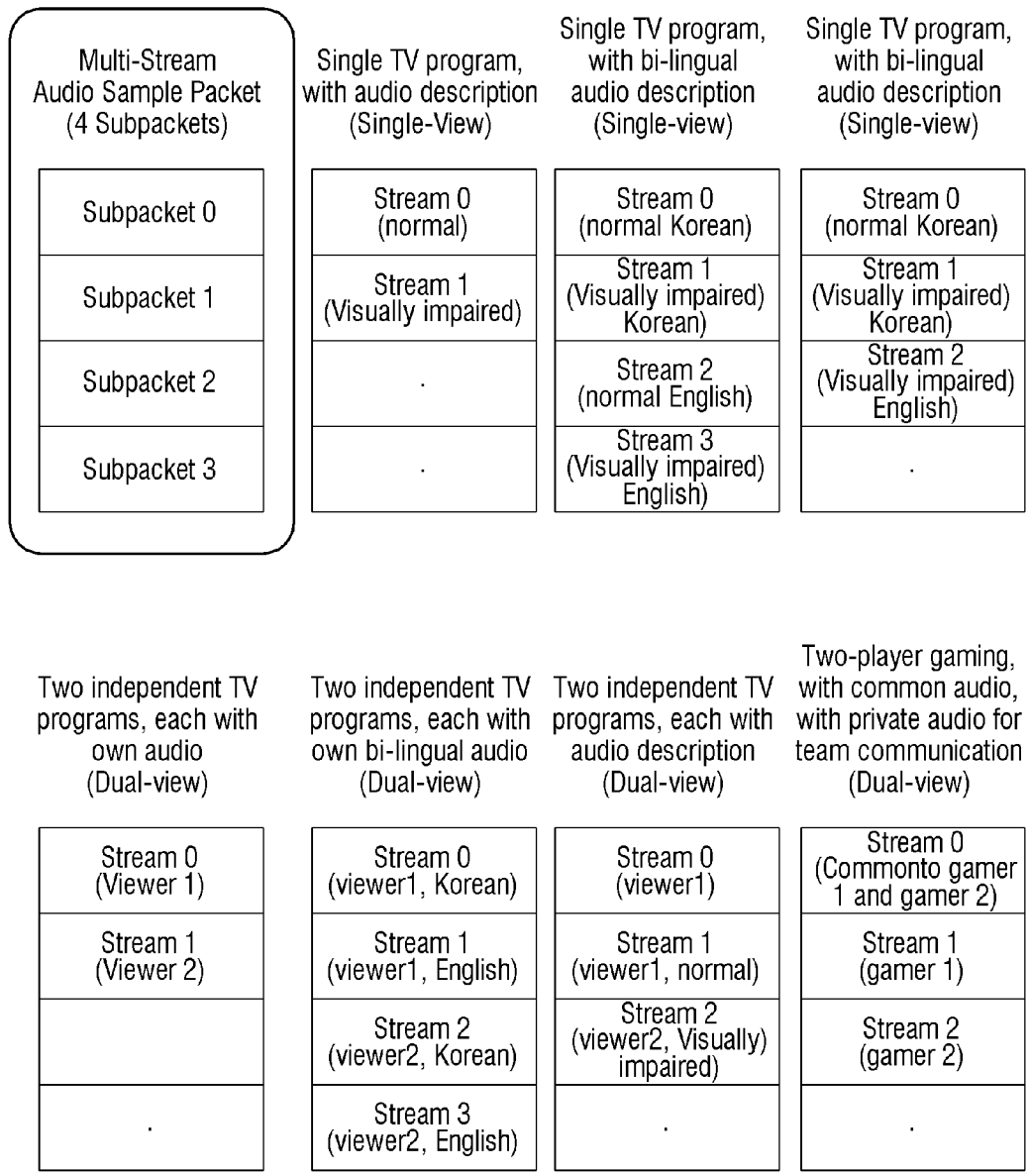
FIG. 17 illustrates scenarios of multi-stream audio sample packets according to an exemplary embodiment.

FIG. 17 illustrates scenarios of multi-stream audio sample packets according to an exemplary embodiment.

In the case of a multi-stream audio sample packet having four sub-packets, the following scenarios may exist. 1) if a single television program is transmitted along with an audio description for single view, stream 0 may include a normal audio signal, and stream 1 may include an audio description signal for the visually impaired.

2) If the single view supports two languages, two audio signal streams in the supported languages are transmitted along with the corresponding audio descriptions. For example, if English and Korean are supported, stream 0 may include a Korean normal audio signal, stream 1 may include an Korean audio description signal for the visually impaired, stream 2 may include an English normal audio signal, and stream 3 may include an English audio description signal for the visually impaired, respectively.

3) In single view, one audio signal stream in one language and two description signals for the visually impaired in different languages may be transmitted, For example, stream 0 may include a Korean or an English normal audio signal, stream 1 may include a Korean audio description signal for the visually impaired, and stream 2 may include an English audio description signal for the visually impaired, respectively.

4) A source apparatus may transmit an audio signal for multi-view. If dual view is supported, the most basic form is to transmit an audio signal in one transmission stream with respect to each view. A dual view includes first and second independent views, and each view provides independent contents.

5) Two languages may be supported for each view. In this case, an audio signal stream in the first language with respect to the first view, an audio signal stream in the second language with respect to the first view, an audio signal stream in the first language with respect to the second view, and an audio signal stream in the second language with respect to the second view may be transmitted, respectively. For example, if English and Korean are supported, stream 0 may include a Korean audio signal with respect to the first view, stream 1 may include an English audio signal with respect to the first view, stream 2 may include a Korean audio signal with respect to the second view, and stream 3 may include an English audio signal with respect to the second view.

6) In the case of dual view, one view may further transmit an audio description signal for the visually impaired. That is, an audio signal stream with respect to the first view, a normal audio signal stream with respect to the second view, and an audio description signal stream for the visually impaired with respect to the second view may be transmitted, respectively. For example, stream 0 may include an audio signal with respect to the first view, stream 1 may include an audio signal with respect to the second view, and stream 3 may include an audio description signal with respect to the second view.

7) One stream may be used to transmit a common audio signal. That is, a common audio signal stream with respect to the first view and the second view, an audio stream exclusive for the first view, and an audio stream exclusive for the second view may be transmitted, respectively. In this case, a receiving end multiplexes and outputs the common audio stream and the exclusive audio stream. Such a scenario may be applied to a game. For example, stream 0 may include a common audio signal (for example, background sound, progress guidance voice, etc.) with respect to the first view and the second view, stream 1 may include an audio signal exclusive for the first view, and stream 2 may include an audio signal exclusive for the second view.

Referring back to FIG. 5, the data transceiving system 1000-1 according to an exemplary embodiment includes the data transmitting apparatus 100-1 and the data receiving apparatus 200-1.

The data transmitting apparatus 100-1 may transmit a packet including a first sub packet and a second sub packet to the data receiving apparatus 200-1.

The data receiving apparatus 200-1 may receive the packet including the first sub packet and the second sub packet from the data transmitting apparatus 100-1.

In this case, the first sub packet and the second sub packet include different audio data with respect to first contents.

Hereinafter, the configurations of the data transmitting apparatus 100-1 and the data receiving apparatus 200-1 according to one or more exemplary embodiments will be described in greater detail.

Referring back to FIG. 6, the data transmitting apparatus 100-1 according to an exemplary embodiment includes the packet generator 110 and the transmitting unit 120.

The packet generator 110 may generate a packet including a first sub packet and a second sub packet. In this case, the first sub packet and the second sub packet include different audio data with respect to first contents.

The transmitting unit 120 transmits the generated packet to the receiving apparatus 200-1. In this case, the first sub packet may include audio data for the non-disabled, and the second sub packet may include audio data for the visually impaired.

The first sub packet and the second sub packet may include audio data in different languages.

The first sub packet may include audio data corresponding to an audio description with respect to the second sub packet.

The packet may further include a third sub packet including audio data with respect to second contents which are different from the first contents.

In this case, the audio data included in the first sub packet may be audio data exclusive for the first contents, the audio data included in the third sub packet may be audio data exclusive for the second contents, and the audio data included in the second sub packet may be common audio data with respect to the first contents and the second contents.

In addition, the packet may further include a fourth sub packet including audio data with respect to the second contents, and the third sub packet and the fourth sub packet may include different audio data.

Referring back to FIG. 7, the data receiving apparatus 200-1 according to an exemplary embodiment includes the receiver 210 and the parsing unit 220.

The receiver 210 may receive a packet including a first sub packet and a second sub packet from the data transmitting apparatus 100-1. In this case, the first sub packet and the second sub packet may include different audio data with respect to the first contents.

The parsing unit 220 is an element to parse the received first sub packet and the received second sub packet.

The first sub packet and the second sub packet may include audio data in different languages.

Unlike the above, the first sub packet may include audio data corresponding to an audio description with respect to the second sub packet.

The packet may further include a third sub packet including audio data with respect to second contents which are different from the first contents.

In this case, the audio data included in the first sub packet may be audio data exclusive for the first contents, the audio data included in the third sub packet may be audio data exclusive for the second contents, and the audio data included in the second sub packet may be common audio data with respect to the first contents and the second contents In addition, the packet may further include a fourth sub packet including audio data with respect to the second contents, and the third sub packet and the fourth sub packet may include different audio data.

Audio Metadata Packet

According to an exemplary embodiment, a source apparatus transmits an audio metadata packet to a sink apparatus to inform a transmitted audio specification. In this case, a header of the audio metadata packet may have the following structure.

TABLE 46

| | Audio Metadata Packet Header | | | | | | | |
|---|---|---|---|---|---|---|---|---|
| | Bit# | | | | | | | |
| Byte | 7 | 6 | 5 | 4 | 3 | 2 | 1 | 0 |
| HB0 | 0 | 0 | 0 | 0 | 1 | 1 | 0 | 1 |
| HB1 | Rsvd(0) | Rsvd(0) | Rsvd(0) | Rsvd(0) | Rsvd(0) | Rsvd(0) | Rsvd(0) | 3D_Audio |
| HB2 | Rsvd(0) | Rsvd(0) | Rsvd(0) | Rsvd(0) | NUM_AUDIO_STR | | NUM_VIEWS | |

The descriptions of each field are as follows.

If the 3D audio field (3D_AUDIO) [1 bit]: 3D_AUDIO=1, the audio metadata packet includes a 3D audio channel count (3D Audio Channel count: 3D_CC field. See the below table) and channel/speaker allocation information ACAST: Audio Channel Allocation Standard Type) field (see the below table). When a source transmits a 3D audio packet, the field may be set to 1.

The view number field (NUM_VIEWS) [2 bits] indicates the number of views. If NUM_VIEWS=00, single view video streaming is supported. If NUM_VIEWS=01, dual view video streaming is supported. This mode may only be permitted when 3D_DualView=1 in VSIF. The remaining NUM_VIEWS values are reserved for future use.

The audio stream number field (NUM_AUDIO_STR) [2 bits] indicates the number of audio streams−1. If NUM_AUDIO_STR=01, 10, or 11, the audio metadata packet includes up to four audio meta descriptors which correspond to an audio stream, respectively.

TABLE 47

Valid combinations

| 3D_AUDIO | NUM_VIEWS | NUM_AUDIO_STR | | Description |
|---|---|---|---|---|
| 1 | 0 | 0 | 0 | 0 | 3D Audio |
| 0 | 0 | 0 | 0 | 1 | Multi-Stream Audio (single-view) |
| 0 | 0 | 0 | 1 | 0 | |
| 0 | 0 | 0 | 1 | 1 | |
| 0 | 0 | 1 | 0 | 1 | Multi-Stream Audio (dual-view) |
| 0 | 0 | 1 | 1 | 0 | |
| 0 | 0 | 1 | 1 | 1 | |
| | else | | | Reserved |

The table below indicates a payload of an audio metadata packet for 3D audio, according to an exemplary embodiment. If 3D_Audio=1, the metadata packet payload has the following structure.

TABLE 48

Audio Metadata Packet Payload(3D_AUDIO==1)

| Byte | Bit# 7 | 6 | 5 | 4 | 3 | 2 | 1 | 0 |
|---|---|---|---|---|---|---|---|---|
| PB0 | Rsvd(0) | Rsvd(0) | Rsvd(0) | 3D_CC4 | 3D_CC3 | 3D_CC2 | 3D_CC1 | 3D_CC0 |
| PB1 | Rsvd(0) | Rsvd(0) | Rsvd(0) | Rsvd(0) | ACAT3 | ACAT2 | ACAT1 | ACAT0 |
| PB2 | 3D_CA7 | 3D_CA6 | 3D_CA5 | 3D_CA4 | 3D_CA3 | 3D_CA2 | 3D_CA1 | 3D_CA0 |
| PB3~PB27 | | | | Reserved(0) | | | | |

That is, a 3D_CC field indicates 3D audio channel count information and an ACAST field indicates an audio channel allocation standard type (ACAST) provided by a source.

Table 49 indicates an audio channel according to a 3D_CC value, and Table 52 indicates an audio channel allocation standard type according to an ACAST field value.

TABLE 49

3D_CC field

| 3D_CC4 | 3D_CC3 | 3D_CC2 | 3D_CC1 | 3D_CC0 | Audio Channel Count |
|---|---|---|---|---|---|
| 0 | 0 | 0 | 0 | 0 | Refer to Stream Header |
| 0 | 0 | 0 | 0 | 1 | 2 channels |
| 0 | 0 | 0 | 1 | 0 | 3 channels |

TABLE 49-continued

3D_CC field

| 3D_CC4 | 3D_CC3 | 3D_CC2 | 3D_CC1 | 3D_CC0 | Audio Channel Count |
|---|---|---|---|---|---|
| 0 | 0 | 0 | 1 | 1 | 4 channels |
| 0 | 0 | 1 | 0 | 0 | 5 channels |
| 0 | 0 | 1 | 0 | 1 | 6 channels |
| 0 | 0 | 1 | 1 | 0 | 7 channels |
| 0 | 0 | 1 | 1 | 1 | 8 channels |
| 0 | 1 | 0 | 0 | 0 | 9 channels |
| 0 | 1 | 0 | 0 | 1 | 10 channels |
| 0 | 1 | 0 | 1 | 0 | 11 channels |
| 0 | 1 | 0 | 1 | 1 | 12 channels |
| — | — | — | — | — | |
| 1 | 1 | 1 | 1 | 1 | 32 channels |

TABLE 50

Audio Channel Allocation Standard Type Field

| ACAT3 | ACAT2 | ACAT1 | ACAT0 | Description |
|---|---|---|---|---|
| 0 | 0 | 0 | 0 | Reserved |
| 0 | 0 | 0 | 1 | Refer to 10 2 channels (TTA Standard) |
| 0 | 0 | 1 | 0 | Refer to 22 2 channels (SMPTE2036-2) |
| 0 | 0 | 1 | 1 | Refer to 30 2 channels (IEC62574/Ed 1) |
| 0 | 1 | 0 | 0 | reserved |
| 1 | 1 | 1 | 1 | |

The table below indicates a payload of an audio metadata packet for multi-stream audio. If 3D_Audio=0, the metadata packet payload has the following structure.

TABLE 51

Audio Metadata Packet Payload (3D_AUDIO==0)

| Byte | Bit# | | | | | | | |
|---|---|---|---|---|---|---|---|---|
| | 7 | 6 | 5 | 4 | 3 | 2 | 1 | 0 |
| PB0~PB4 | Audio_Metadata_Descriptor_0 | | | | | | | |
| PB5~PB9 | Audio_Metadata_Descriptor_1 | | | | | | | |
| PB10~PB14 | Audio_Metadata_Descriptor_2 | | | | | | | |
| PB15~PB19 | Audio_Metadata_Descriptor_3 | | | | | | | |
| PB20~PB27 | Reserved(0) | | | | | | | |

As illustrated in Table 51 above, the payload of the audio metadata packet includes 5-byte audio meta data descriptors. The audio metadata descriptor (4 fields, 5 byte for each) indicates audio metadata with respect to sub packet X in a multi-stream audio sample packet or audio metadata with respect to sub packet X in a multi-stream one bit audio sample packet. The structure of the audio metadata descriptor according to an exemplary embodiment will be described below.

TABLE 52

Audio Metadata Descriptor (with respect to each sub packet X in multi-stream ASP)

| PB(N + 0) | Emergency_Channel | Rsvd(0) | Rsvd(0) | Rsvd(0) | Rsvd(0) | Rsvd(0) | Multiview_Right | Multiview_Left |
|---|---|---|---|---|---|---|---|---|
| PB(N + 1) | LC_Valid | Rsvd(0) | Rsvd(0) | Suppl_A_Valid | Suppl_A_Mixed | | Suppl_A_Type | |
| PB(N + 2) | Language_Code(3 Bytes) | | | | | | | |
| PB(N + 3) | | | | | | | | |
| PB(N + 4) | | | | | | | | |

The descriptions of each field are as follows.

The emergency channel field (Emergency_Channel) [1 bit]: If Emergency_Channel=1, a corresponding audio stream transmits emergency warning audio data. A receiving apparatus may inform that there is emergency broadcasting through a script, etc., and a user may output an emergency warning audio signal which is received through a selection of audio.

The multi-view field (left) (Multiview_Left) [1 bit]: If Multiview_Left=1, a corresponding audio stream is mapped with a left stereoscopic image in a 3D video format. If Multiview_Left=0, the field may only be valid when NUM_VIEWS=01.

If Multiview_Right=1, a corresponding audio stream is mapped with a right stereoscopic image in a 3D video format. If Multiview_Right=0, the field may only be valid when NUM_VIEWS=01.

The language code valid field (LC_Valid) [1 bit]: If LC_Valid=1, the language code is valid, and the language of a corresponding audio stream is accurately identified. Otherwise, it is considered that the language of a corresponding audio steam is not specified.

The supplemental audio valid field (Suppl_A_Valid) [1 bit]: If Suppl_A_Valid=1, a corresponding audio stream includes a supplemental audio track which is indicated by Suppl_A_Type.

The pre-mixed supplemental audio field (Suppl_A_Mixed) [1 bit]: If Suppl_A_Mixed=1, a corresponding audio stream may include a pre-mixed supplemental audio track indicated by a main audio component and Suppl_A_Type._The bit is valid only when Suppl_A_Valid=1.

The supplemental audio type field (Suppl_A_Type) [3 bits] indicates a supplemental audio type defined in the following Table 55. The field is valid when Suppl_A_Valid=1. Table 53 indicates the description of a supplemental audio type field value.

The language (Language_Code) [3 Bytes] identifies the language of a corresponding audio stream. The language code is defined by ISO639. In addition, three character codes are located, and the last character code is identical to the last byte of audio metadata descriptor X (Audio_Metadata_Descriptor_X). This field may only be valid when LC_Valid=1.

TABLE 53

SUPPL_A_TYPE field

| SUPPL_A_TYPE | | | Description |
|---|---|---|---|
| 0 | 0 | 0 | Reserved |
| 0 | 0 | 1 | Audio for visually impaired (contains narrative description of content) |
| 0 | 1 | 0 | Audio for visually impaired (spoken subtitles) |
| 0 | 1 | 1 | Audio for hearing impaired (enhanced intelligibility of dialogue) |
| else | | | Reserved |

Referring back to FIG. 9, the data transceiving system 1000-2 according to another exemplary embodiment includes the data transmitting apparatus 100-2 and the data receiving apparatus 200-2.

The data transmitting apparatus 100-2 generates an audio metadata packet and transmits the generated audio metadata packet to the data receiving apparatus 200-2.

The data receiving apparatus 200-2 receives the audio metadata packet from the data transmitting apparatus 100-2.

In this case, a header of the audio metadata packet includes a 3D audio field indicating whether a 3D audio sample packet is transmitted.

Hereinafter, the configurations of the data transmitting apparatus 100-2 and the data receiving apparatus 200-2 and the configuration of the audio metadata packet will be described in greater detail.

Referring back to FIG. 10, the data transmitting apparatus 100-2 according to another exemplary embodiment includes the packet generator 110 and the transmitting unit 120.

The packet generator 110 generates an audio metadata packet. A header of the generated audio metadata packet may include a 3D audio field indicating whether a 3D audio sample packet is transmitted.

The transmitting unit 120 transmits the generated audio metadata packet to the data receiving apparatus 200-2.

In addition, the header of the generated audio metadata packet may further include an audio stream number field (Number Of Audio Stream Field) indicating audio stream number information.

Further, the header of the generated audio metadata packet may further include a view number field (Number Of Views Field) indicating information on the number of different contents which are transmitted.

A payload of the generated audio metadata packet may include an audio metadata descriptor field indicating metadata regarding a sub packet of a multi-stream audio sample packet or a multi-stream one bit audio sample packet.

The audio metadata descriptor field includes at least one of an emergency channel field indicating whether there is an emergency broadcasting, a multi-view field indicating whether audio data corresponding to a left-eye image or a right-eye image is included in a multi-view, a language code valid field indicating whether a language of audio data is identified, a supplemental audio valid field indicating whether there is supplemental audio data, a pre-mixed supplemental audio field indicating whether a main audio data and the supplemental audio data are pre-mixed, a supplemental audio type field indicating a type of the supplemental audio data, and a language code field indicating a language code of audio data.

Referring back to FIG. 11, the data receiving apparatus 200-2 according to another exemplary embodiment includes the receiver 210 and the parsing unit 220.

The receiver 210 is an element to receive an audio metadata packet from the data transmitting apparatus 100-2. A header of the audio metadata packet includes a 3D audio field indicating whether a 3D audio sample packet is transmitted.

The parsing unit 220 is an element to parse the received audio metadata packet.

In this case, the audio metadata descriptor field includes at least one of an emergency channel field indicating whether there is an emergency broadcasting, a multi-view field indicating whether audio data corresponding to a left-eye image or a right-eye image is included in a multi-view, a language code valid field indicating whether a language of audio data is identified, a supplemental audio valid field indicating whether there is supplemental audio data, a pre-mixed supplemental audio field indicating whether a main audio data and the supplemental audio data are pre-mixed, a supplemental audio type field indicating a type of the supplemental audio data, and a language code field indicating a language code of audio data.

Audio Data Block

Table 54 below indicates an audio data block of Extended Display Identification Data (EDID) according to an exemplary embodiment. The portions regarding bytes 3-4 in Table 54 are redefined in Table 57 below.

In addition, a new short audio descriptor (SAD) for multi-stream audio is deleted and instead, a normal SAD defined in EDID is used. According to the added feature, up to two channels may be transmitted.

TABLE 54

| Byte | HDMI Audio Data Block | | | | | | | |
|---|---|---|---|---|---|---|---|---|
| | Bit# | | | | | | | |
| | 7 | 6 | 5 | 4 | 3 | 2 | 1 | 0 |
| 1 | Tag code = 7 (Use Extended Tag) | | | L = Length of following data block payload(in bytes) | | | | |
| 2 | Extended Tag Code = 18(0x12) | | | | | | | |
| 3 | NUM_HDMI_3D_AD(=X) | | | NUM_CCA_SAD(=Y) | | Max_Stream_Count−1 | | |
| (4)~(7) | (if NUM_HDMI_3D_AD > 0) HDMI_3D_AD_1 | | | | | | | |
| ... | ... | | | | | | | |
| (4*X)~(4*X + 3)°° | (if NUM_HDMI_3D_AD > 0) | | | | | | HDMI_3D_AD_X | |
| (4*X + 4)~(4*X + 7) | (if NUM_HDMI_3D_AD > 0) | | | | | | HDMI_3D_SAD | |
| (N + 1°°)~(N + 3) | (if Max_Stream_Count − 1 > 0 and NUM_CEA_SAD > 0) | | | | | | CEA_SAD_1 | |
| ... | ... | | | | | | | |
| (L − 1)~(L + 1) | (if Max_Stream_Count − 1 > 0 and NUM_CEA_SAD > 0) | | | | | | CEA_SAD_Y | |

In addition, the header of the audio metadata packet may further include an audio stream number field (Number Of Audio Stream Field) indicating information on the number of audio streams which are received.

The header of the audio metadata packet may further include a view number field (Number Of Views Field) indicating information on the number of different contents which are received.

A payload of the audio metadata packet may include an audio metadata descriptor field indicating metadata regarding a sub packet of a multi-stream audio sample packet or a multi-stream one bit audio sample packet.

The below table indicates the configuration of a block which replaces bytes 3-4 of the above audio data block.

TABLE 55

| Byte | Byte 3-4 of HDMI Audio Data Block | | | | | | | |
|---|---|---|---|---|---|---|---|---|
| | Bit# | | | | | | | |
| | 7 | 6 | 5 | 4 | 3 | 2 | 1 | 0 |
| 3 | Supports_MS_Emergency | Rsvd(0) | Supports_MS_Mix | Supports_MS_Suppl | Supports_MS_Lang | Supports_MS_Multiview | Max_Stream_Count − 1 | |
| 4 | Rsvd(0) | Rsvd(0) | Rsvd(0) | Rsvd(0) | Rsvd(0) | NUM_HDMI_3D_AD(=X) | | |

The descriptions of each field are as follows.

The emergency channel field (Supports_MS_Emergency) [1 bit]: If Supports_MS_Emergency=1, a sink apparatus supports receiving and processing an emergency warning audio channel. If Supports_MS_Emergency=0, a sink apparatus does not support the above operations.

The audio mix field (Supports_MS_Mix) [1 bit]: If Supports_MS_Mix=1, a sink apparatus supports compositing main audio and supplementary audio. If Supports_MS_

Mix=0, a sink apparatus does not support the compositing and supports only reproducing mixed audio.

The supplemental audio support field (Supports_MS_Supple) [1 bit]: If Supports_MS_Supple=1, a sink apparatus supports multi-stream audio having a supplemental audio track for the visually/hearing impaired. If Supports_MS_Supple=0, nothing is indicated, or it is indicated that a sink apparatus does not support a supplemental audio track for the visually/hearing impaired.

The language support field (Supports_MS_Lang) [1 bit]: If Supports_MS_Lang=1, a sink apparatus supports multi-stream audio having various language audio streams. If Supports_MS_Lang=0, nothing is indicated, or it is indicated that a sink apparatus does not support various language audio streams.

The multi-view audio support field (Supports_MS_MultiView) [1 bit]: If Supports_MS_MultiView=1, a sink apparatus supports multi-stream audio for multi-view video streaming. If Supports_MS_MultiView=0, nothing is indicated, or it is indicated that a sink apparatus does not support multi-stream audio for multi-view video streaming.

The maximum stream count field (Max_Stream_Count-1) [2 bits] indicates the maximum number of audio streams handled by a sink apparatus. Max_Stream_Count-1 value is illustrated in the following table.

The audio descriptor number field NUM_HDMI_3D_AD) [3 bits] indicates the number of 3D audio descriptors.

TABLE 56

Max_Stream_Count-1 field

| Max_Stream_Count-1 | Description |
| --- | --- |
| 00 | Do not Support Multi-Stream Audio |
| 01 | 2 audio streams |
| 10 | 3 audio streams |
| 11 | 4 audio streams |

Figure 12:
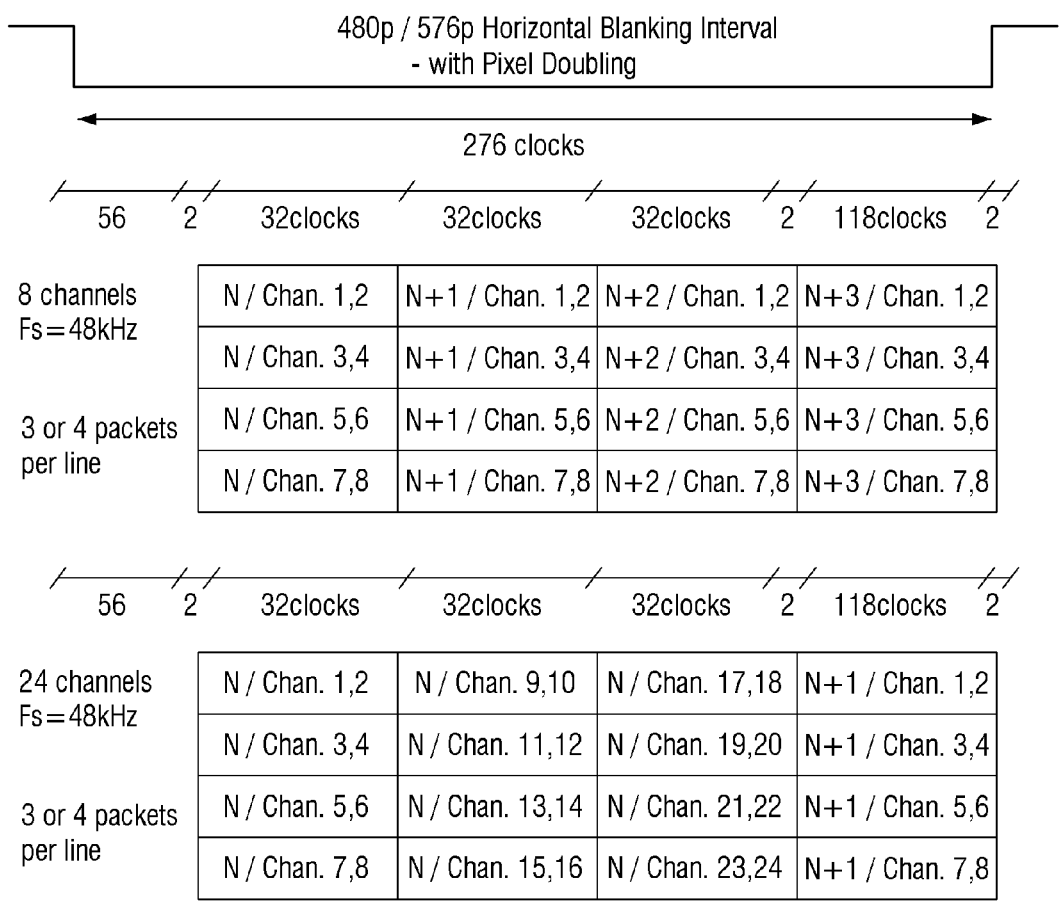
FIGS. 12 and 13 are views illustrating a transmission timing of a three-dimensional (3D) audio signal, according to one or more exemplary embodiments.

Referring back to FIG. 12, the data transceiving system 1000-3 according to yet another exemplary embodiment includes the data transmitting apparatus 100-3 and the data receiving apparatus 200-3.

The data transmitting apparatus 100-3 generates display identification information including information on properties supported by a sink apparatus with respect to audio data, and transmits the generated information to the data receiving apparatus 200-3.

The data receiving apparatus 200-3 receives the display identification information from the data transmitting apparatus 100-3 and analyzes the information. In this case, the display identification information includes a main/supplemental audio properties field indicating information on properties of main audio and supplemental audio supported by the sink apparatus.

Hereinafter, the data transmitting apparatus 100-3 and the data receiving apparatus 200-3 will be described in greater detail.

Figure 13:
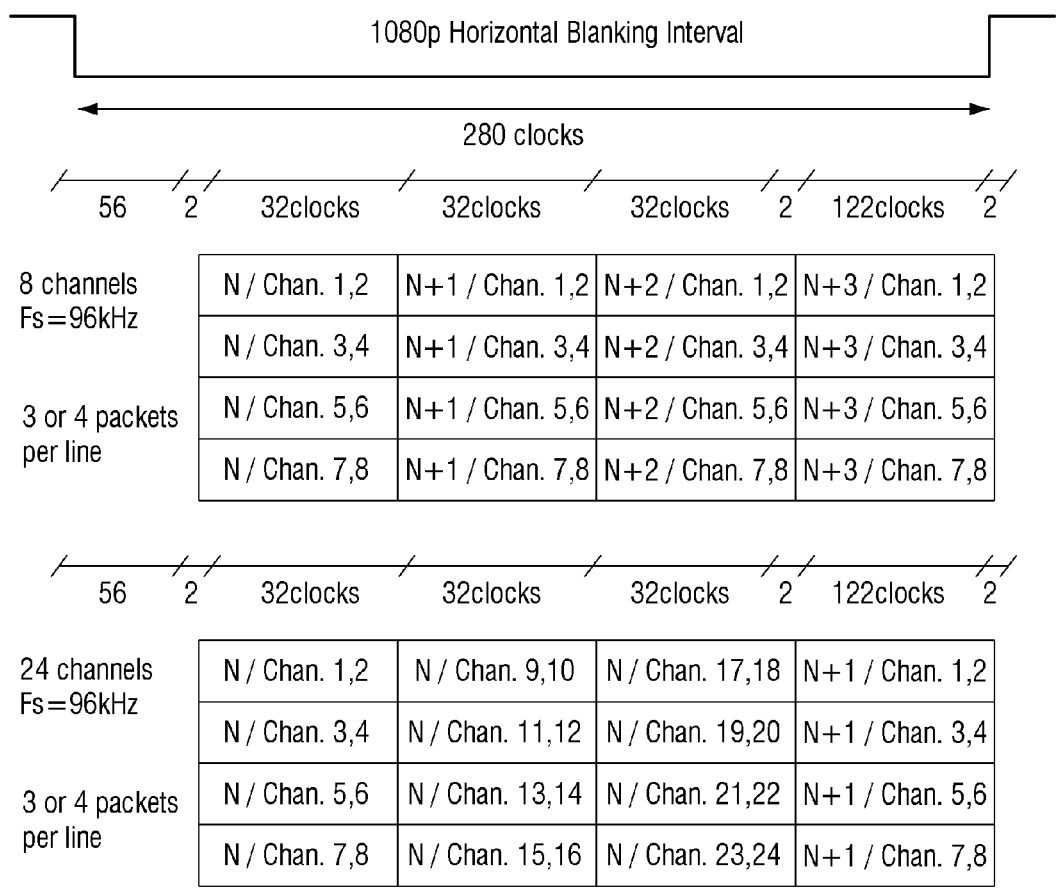

Referring back to FIG. 13, the data transmitting apparatus 100-3 according to yet another exemplary embodiment includes the generator 130 and the transmitting unit 120.

The generator 130 is an element to generate display identification information including information on properties supported by a sink apparatus with respect to audio data.

The transmitting unit 120 transmits the display identification information to the data receiving apparatus 200-3.

In this case, the display identification information includes a main/supplemental audio properties field indicating information on properties of main audio and supplemental audio supported by the sink apparatus.

In this case, the main/audio properties field includes at least one of an audio mix field indicating whether the sink apparatus supports composition of main audio and supplemental audio, a supplemental audio support field indicating whether the sink apparatus supports supplemental audio, a language support field indicating whether the sink apparatus supports audio data in a plurality of languages, a multi-view audio support field indicating whether the sink apparatus supports multi-stream audio data for a multi-view content, a maximum stream count field indicating a number of maximum audio streams which is handled by the sink apparatus, and an audio descriptor number field indicating a number of 3D audio descriptors.

The display identification information may further include an emergency channel field indicating whether the sink apparatus supports receiving and processing of emergency broadcasting.

Referring back to FIG. 14, the data transmitting apparatus 100-3 according to yet another exemplary embodiment includes the receiver 210 and the analyzing unit 230.

The receiver 210 is an element to receive display identification information including information on properties supported by a sink apparatus with respect to audio data, from the data transmitting apparatus 100-3.

The analyzing unit 230 analyzes the received display identification information.

In this case, the display identification information includes a main/supplemental audio properties field indicating information on properties of main audio and supplemental audio supported by the sink apparatus.

In this case, the main/audio properties field includes at least one of an audio mix field indicating whether the sink apparatus supports composition of main audio and supplemental audio, a supplemental audio support field indicating whether the sink apparatus supports supplemental audio, a language support field indicating whether the sink apparatus supports audio data in a plurality of languages, a multi-view audio support field indicating whether the sink apparatus supports multi-stream audio data for a multi-view content, a maximum stream count field indicating a number of maximum audio streams which is handled by the sink apparatus, and an audio descriptor number field indicating a number of 3D audio descriptors.

The display identification information may further include an emergency channel field indicating whether the sink apparatus supports receiving and processing of emergency broadcasting.

Meanwhile, a wired interface according to various exemplary embodiments may support transmission of quid view content. A 3D video format standard of HDMI wired interface standard may be used for quid view transmission.

Figure 18A:
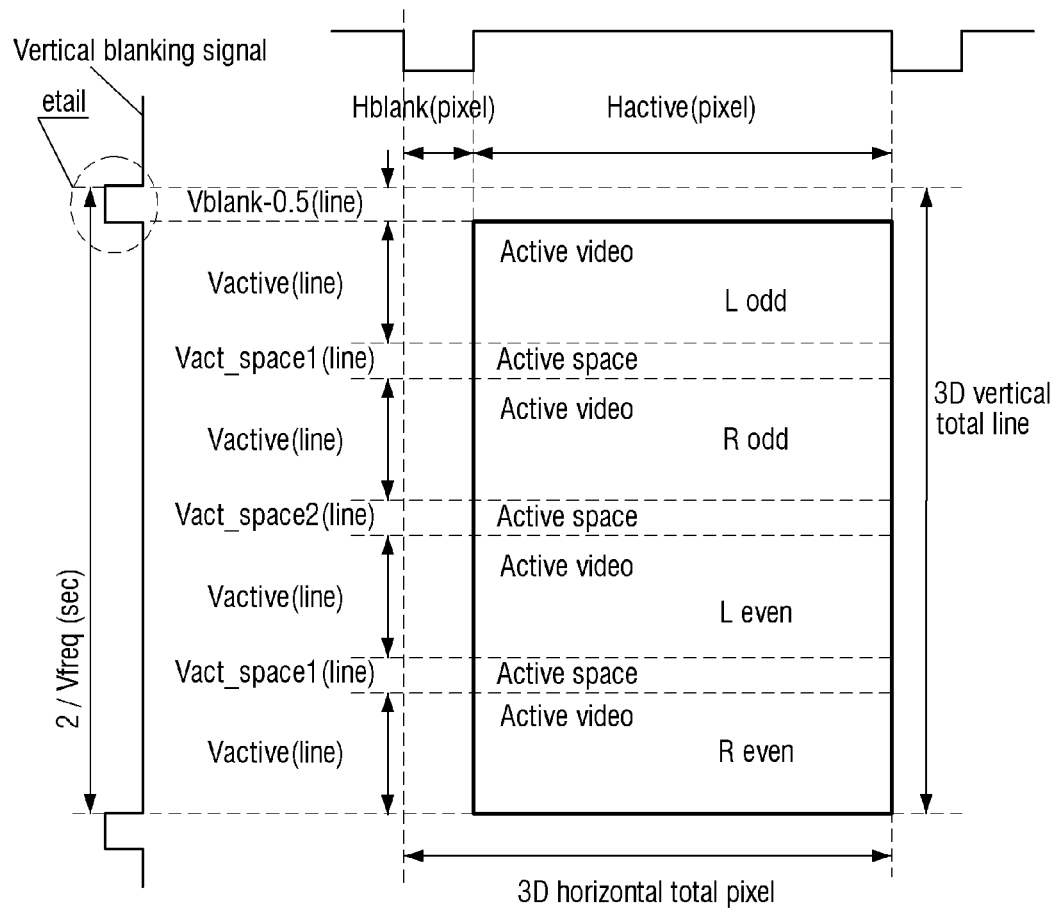
FIGS. 18A to 18C are views illustrating various data transmitting formats when quad view video contents are transmitted in a 3D interlace format, according to one or more exemplary embodiments.
Figure 18B:
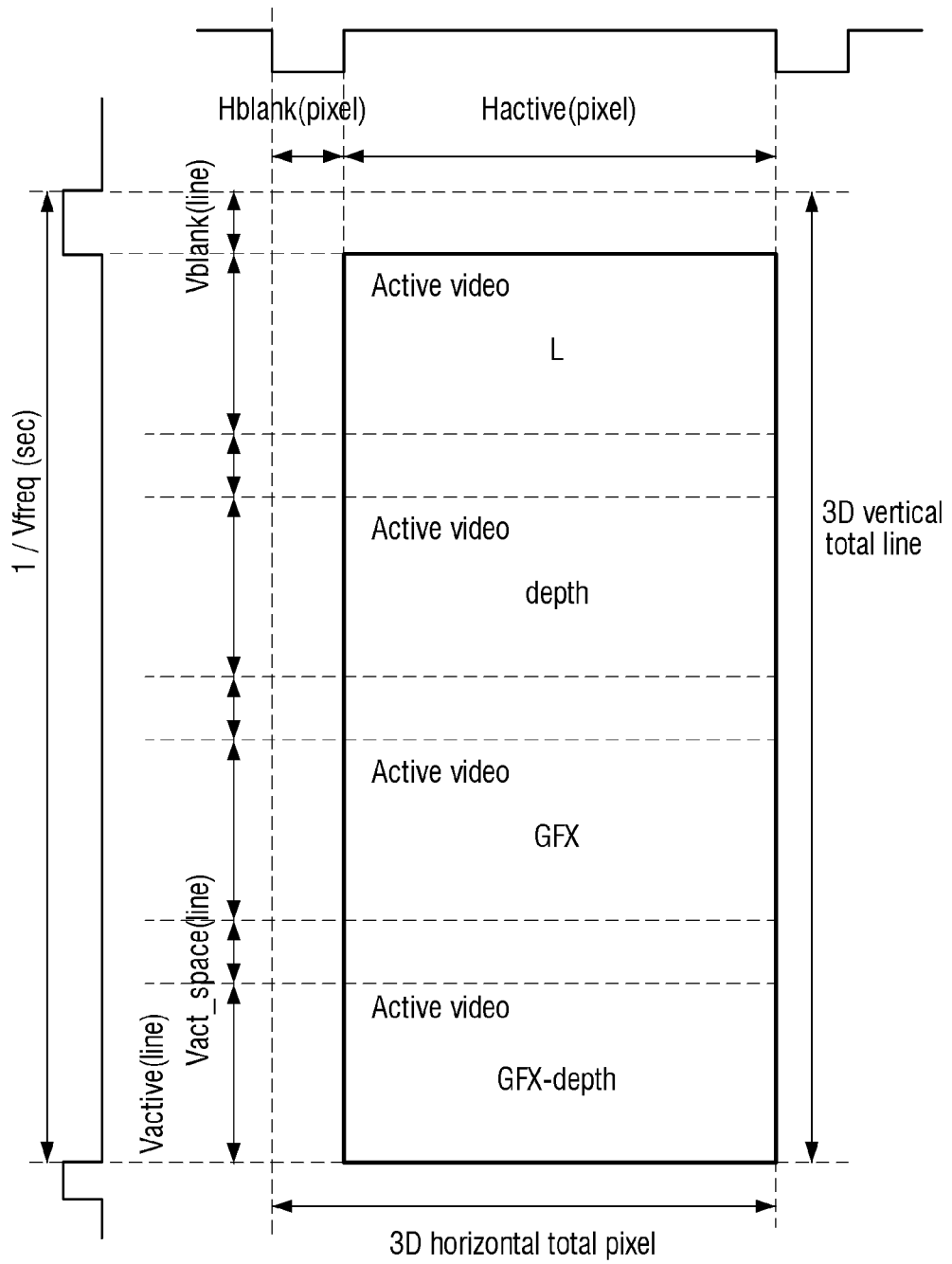
Figure 18C:
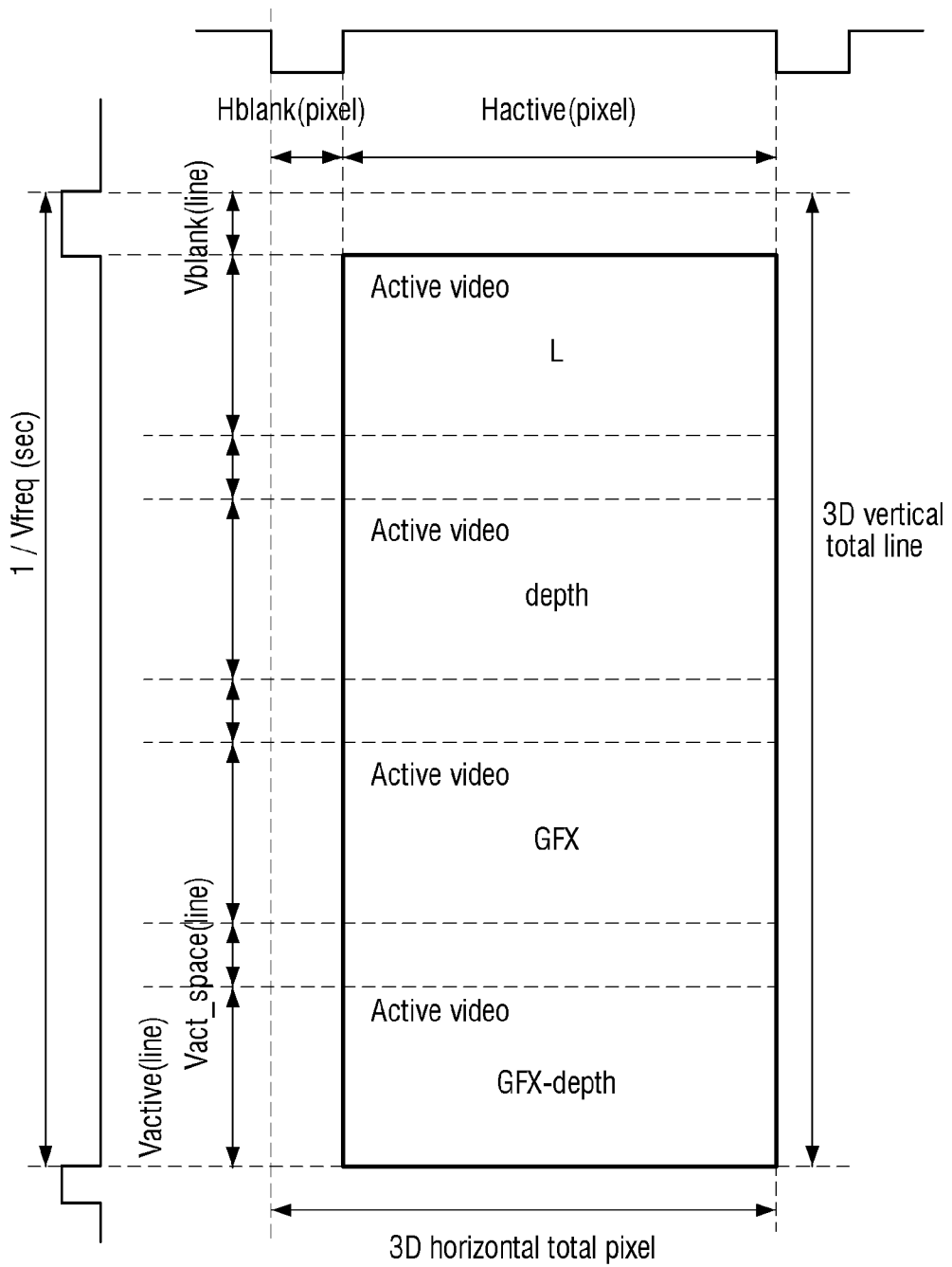

FIGS. 18A to 18C are views illustrating various data transmitting formats when quad view video contents are transmitted in a 3D interlace format, according to one or more exemplary embodiments.

In this case, a vendor-specific InfoFrame and a vendor-specific data block may be modified. Specifically, a related art field to define a 3D dual view is extended as far as to a reserved area.

TABLE 57

| | | | | VSIF (Packet Body) | | | | |
|---|---|---|---|---|---|---|---|---|
| Byte # | 7 | 6 | 5 | 4 | 3 | 2 | 1 | 0 |
| PB0 | | | | Checksum | | | | |
| PB1 | | | | IEEE Registration Identifier(C4-5D-D8) | | | | |
| PB2 | | | | (third octet(D8) first) | | | | |
| PB3 | | | | | | | | |
| PB4 | HDMI_F_Video_Format | | | 3D_Valid | Rsvd(0) | Rsvd(0) | Rsvd(0) | Y420 |
| PB5 | | | | Extended_VIC | | | | |
| (PB6) | | | | If (3D_Valid is set(=1)) then | | | | |
| | 3D_F_Structure | | | | 3D_Additional-Info_present | 3D_Disparity-Data_present | 3D_Meta_present | Rsvd(0) |
| (PB7) | | | | If (3D_Valid is set(=1)) then | | | | |
| | 3D_F_Ext_Data | | | | | Rsvd(0) | | |
| (PB8) | | | | If (3D_AddtionalInfo_present set(=1)) then | | | | |
| | Rsvd(0) | Rsvd(0) | Rsvd(0) | 3D_DualView | 3D_ViewDependancy | | 3D_Preferred2DView | |
| ... | | | | ... | | | | |

TABLE 58

NUM_VIEWS (Rsvd + 3D_DualView)

| NUM_VIEWS | | Description |
|---|---|---|
| 0 | 0 | Reserved |
| 0 | 1 | Dual-view |
| 1 | 0 | Triple-view |
| 1 | 1 | Quad-view |

TABLE 59

| | | | | VSDB | | | | |
|---|---|---|---|---|---|---|---|---|
| Byte# | 7 | 6 | 5 | 4 | 3 | 2 | 1 | 0 |
| 0 | Vendor-specific tag code(=3) | | | | Length(=n) | | | |
| 1 | | | | IEEE Registration Identifier(C4-5D-D8) | | | | |
| 2 | | | | (third octet(D8) first) | | | | |
| 3 | | | | | | | | |
| 4 | | | | Max_TMDS_Character_Clock | | | | |
| 5 | HDMI_F_VIC_LEN(M) | | | F_3D_present | | Y420_present | Dual_View | Rsvd(0) |
| ... | | | | ... | | | | |

Hereinafter, a data transceiving method according to various exemplary embodiments will be described.

Figure 19:
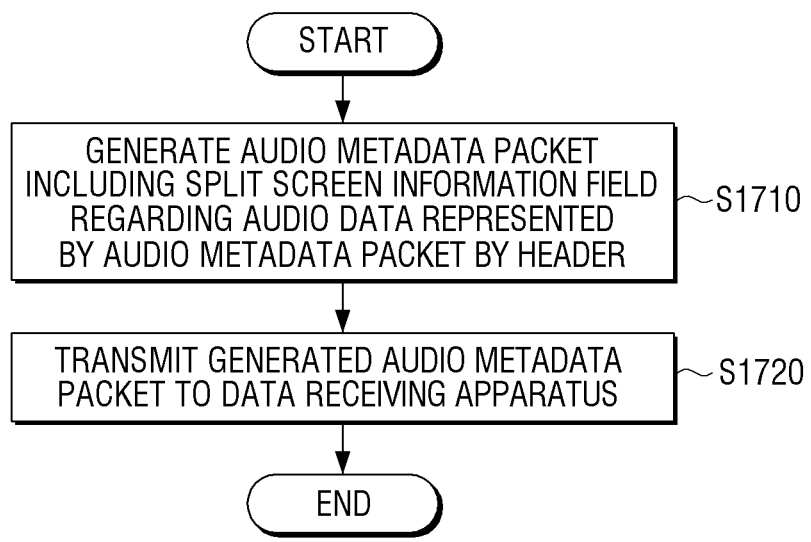
FIG. 19 is a flowchart of a data transmitting method according to an exemplary embodiment.
Figure 20:
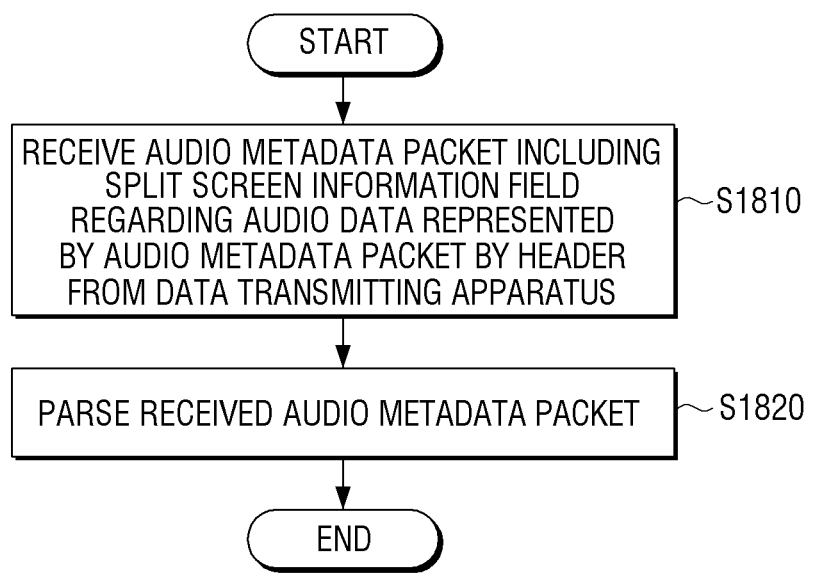
FIG. 20 is a flowchart of a data receiving method according to an exemplary embodiment.

FIG. 19 is a flowchart of a data transmitting method according to an exemplary embodiment, and FIG. 20 is a flowchart of a data receiving method according to an exemplary embodiment.

Referring to FIG. 19, a data transmitting method according to an exemplary embodiment includes generating an audio metadata packet (operation S1710), and transmitting the generated audio metadata packet to a data receiving apparatus (operation S1720). In this case, a header of the generated audio metadata packet includes a split screen information field in relation to audio data represented by the audio metadata packet.

Furthermore, the split screen information field may include at least one of a split screen valid field indicating whether split screen is supported and a split screen type field indicating a type of split screen in relation with transmitted audio data.

In addition, the split screen type field may indicate one of a first split mode where a display screen is split horizontally, a second split mode where the display screen is split vertically, a third split mode where a PIP screen is displayed within the display screen, and a fourth split mode where the display screen is split into three or more screens.

The header of the generated audio metadata packet may include at least one of a view type field indicating whether a transmitted content is a multi-view content or a single-view content, a sequence number field indicating a sequence number of the audio metadata packet, and an audio stream number field indicating information on a number of transmitted audio streams.

A payload of the generated audio metadata packet may include a multi-audio descriptor field indicating metadata regarding a sub packet of a multi-audio sample packet.

The multi-audio descriptor may include at least one of a split screen tag field indicating split screen information corresponding to audio data represented by the generated audio metadata packet, an associated view ID field indicating a view corresponding to audio data represented by the generated audio metadata packet, a valid language code field indicating whether the multi-audio descriptor field includes a valid language code, a mixed audio field indicating whether main audio data and supplemental audio data are pre-mixed, an SAT present field indicating whether the multi-audio descriptor field includes information regarding a type of valid supplemental audio data, a supplemental audio type field indicating a type of supplemental audio data for audio data represented by the generated audio metadata packet, and a language code field indicating a language code defined ISO639 of audio data represented by the generated audio metadata packet.

Referring to FIG. 20, a data receiving method according to an exemplary embodiment includes receiving an audio metadata packet from a data transmitting apparatus (operation S1810), and parsing the received audio metadata packet (operation S1820). In this case, a header of the received audio metadata packet includes a split screen information field in relation to audio data represented by the audio metadata packet.

In addition, the split screen information field may include at least one of a split screen valid field indicating whether split screen is supported and a split screen type field indicating a type of split screen in relation with transmitted audio data.

The split screen type field may indicate one of a first split mode where a display screen is split horizontally, a second split mode where the display screen is split vertically, a third split mode where a PIP screen is displayed within the display screen, and a fourth split mode where the display screen is split into three or more screens.

The header of the generated audio metadata packet may further include at least one of a view type field indicating whether a transmitted content is a multi-view content or a single-view content, a sequence number field indicating a sequence number of the audio metadata packet, and an audio stream number field indicating information on a number of transmitted audio streams.

A payload of the generated audio metadata packet may include a multi-audio descriptor field indicating metadata regarding a sub packet of a multi-audio sample packet.

Figure 21:
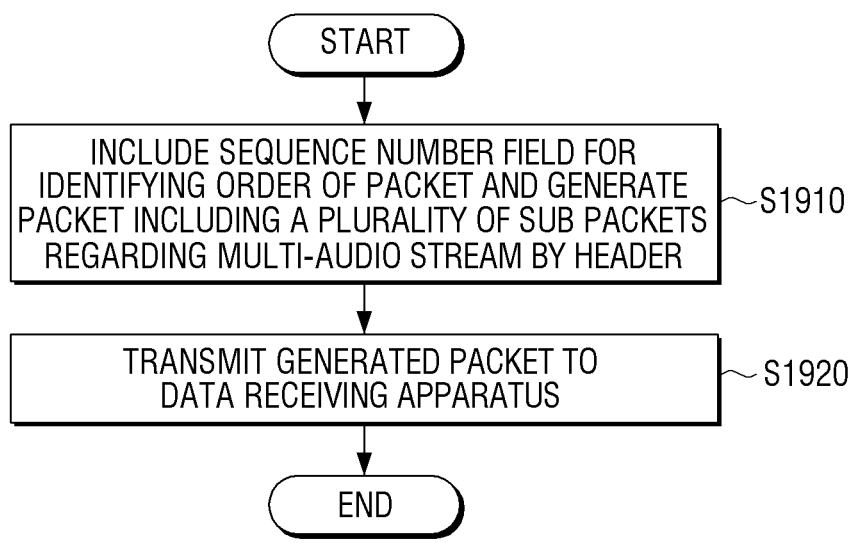
FIG. 21 is a flowchart of a data transmitting method according to another exemplary embodiment.
Figure 22:
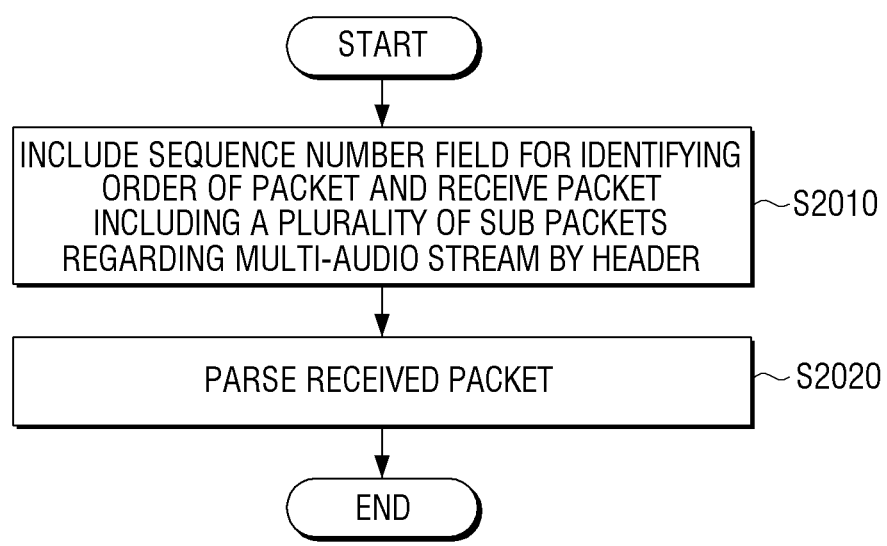
FIG. 22 is a flowchart of a data receiving method according to another exemplary embodiment.

FIG. 21 is a flowchart of a data transmitting method according to another exemplary embodiment, and FIG. 22 is a flowchart of a data receiving method according to another exemplary embodiment.

Referring to FIG. 21, a data transmitting method according to another exemplary embodiment includes generating a packet including a plurality of sub packets regarding a multi-audio stream (operation S1910), and transmitting the generated packet to a receiving apparatus (operation S1920). In this case, a header of the generated packet includes a sequence number field for identifying an order of the generated packet among all packets.

Referring to FIG. 22, a data transmitting method according to another exemplary embodiment includes receiving a packet including a plurality of sub packets regarding a multi-audio stream (operation S2010), and parsing the received packet (operation S2020). In this case, a header of the received packet includes a sequence number field for identifying an order of the generated packet among all packets.

Figure 23:
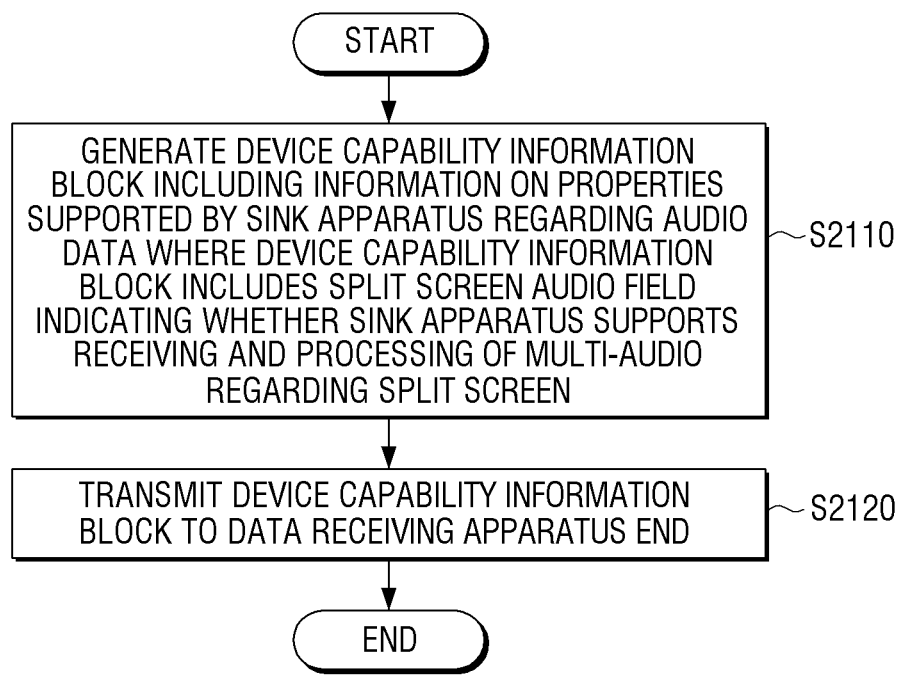
FIG. 23 is a flowchart of a data transmitting method according to yet another exemplary embodiment.
Figure 24:
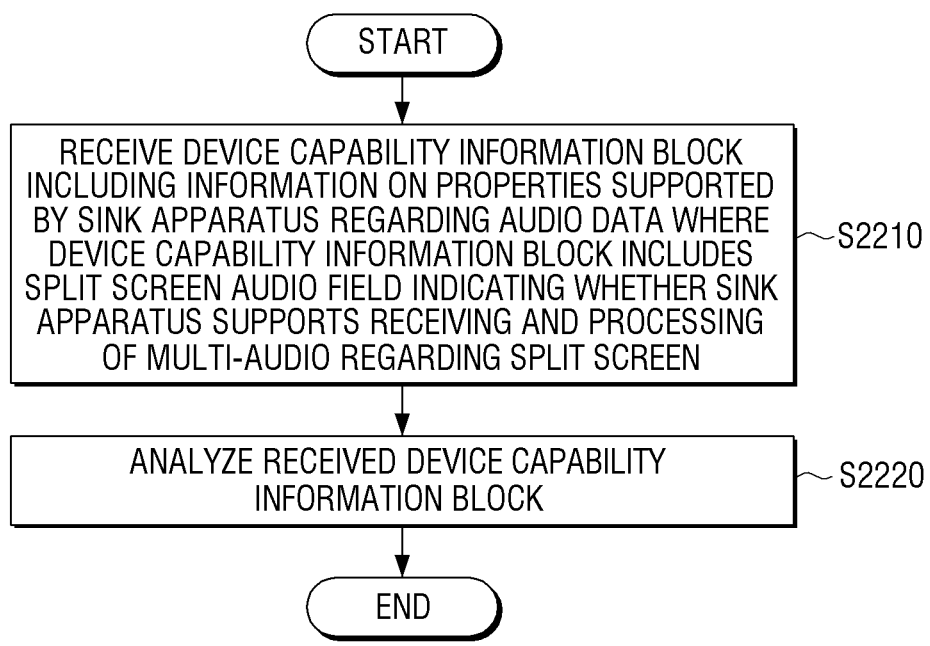
FIG. 24 is a flowchart of a data receiving method according to yet another exemplary embodiment.

FIG. 23 is a flowchart of a data transmitting method according to yet another exemplary embodiment, and FIG. 24 is a flowchart of a data receiving method according to yet another exemplary embodiment.

Referring to FIG. 23, a data transmitting method according to yet another exemplary embodiment includes generating a device capability information block including information on properties supported by a sink apparatus regarding audio data (operation S2110), and transmitting the device capability information block to a data receiving apparatus (operation S2120). In this case, the device capability information block includes a split screen audio field indicating whether the sink apparatus supports receiving and processing of multi-audio regarding split screen.

Referring to FIG. 24, a data receiving method according to yet another exemplary embodiment includes receiving a device capability information block including information on properties supported by a sink apparatus regarding audio data (operation S2210), analyzing the received device capability information block (operation S2220). In this case, the device capability information block includes a split screen audio field indicating whether the sink apparatus supports receiving and processing of multi-audio regarding split screen.

While not restricted thereto, an exemplary embodiment can be embodied as computer-readable code on a computer-readable recording medium. The computer-readable recording medium is any data storage device that can store data that can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network-coupled computer systems so that the computer-readable code is stored and executed in a distributed fashion. Also, an exemplary embodiment may be written as a computer program transmitted over a computer-readable transmission medium, such as a carrier wave, and received and implemented in general-use or special-purpose digital computers that execute the programs. Moreover, it is understood that in exemplary embodiments, one or more units or elements of the above-described apparatuses and systems can include circuitry, a processor, a microprocessor, etc., and may execute a computer program stored in a computer-readable medium. For example, the computer program may include one or more algorithms corresponding to the methods described above.

The foregoing exemplary embodiments and advantages are merely exemplary and are not to be construed as limiting the present inventive concept. The present teaching can be readily applied to other types of apparatuses. Also, the description of the exemplary embodiments of the present inventive concept is intended to be illustrative, and not to limit the scope of the claims, and many alternatives, modifications, and variations will be apparent to those skilled in the art.

DESCRIPTION ON REFERENCE NUMERALS 1000-1, 1000-2, 1000-3: data transceiving system
100-1, 100-2, 100-3: data transmitting apparatus
200-1, 200-2, 200-3: data receiving apparatus
110: packet generator
120: transmitting unit
130: generator
210: receiver
220: parsing unit
230: analyzing unit

What is claimed is:

1. A data transmitting apparatus, comprising:
a packet generator configured to generate an audio metadata packet associated with audio data; and
a transmitter configured to transmit the generated audio metadata packet to a data receiving apparatus,
wherein the generated audio metadata packet comprises a split screen information field in relation to the audio data,
wherein the split screen information field comprises a split screen valid field and a split screen configuration field, the split screen valid field indicating whether a split screen is supported,
wherein, when the split screen valid field is set to a first predefined value, the split screen configuration field is valid and the split screen configuration field indicates a split screen mode that determines how a screen is split, and
wherein, when the split screen valid field is set to a second predefined value, the split screen configuration field is invalid.

2. The data transmitting apparatus as claimed in claim 1, wherein the first predetermined value is 1 and the second predefined value is 0, and the split screen configuration field is specified in a 7-bit field that follows after the split screen valid field.

3. The data transmitting apparatus as claimed in claim 1, wherein the split screen mode comprises at least one of:
   a first split mode in which a display screen is split horizontally;
   a second split mode in which the display screen is split vertically;
   a third split mode in which a picture-in-picture (PIP) screen is displayed within the display screen; and
   a fourth split mode in which the display screen is split into three or more screens.

4. The data transmitting apparatus as claimed in claim 1, wherein the generated audio metadata packet further comprises at least one of:
   a view type field indicating whether a transmitted content is a multi-view content or a single-view content;
   a sequence number field indicating a sequence number of the generated audio metadata packet; and
   an audio stream number field indicating information on a number of transmitted audio streams.

5. The data transmitting apparatus as claimed in claim 1, wherein a payload of the generated audio metadata packet comprises a multi-audio descriptor field indicating metadata regarding a sub packet of a multi-audio sample packet.

6. The data transmitting apparatus as claimed in claim 5, wherein the multi-audio descriptor comprises at least one of:
   a split screen tag field indicating split screen information corresponding to the audio data;
   an associated view identification (ID) field indicating a view corresponding to the audio data;
   a valid language code field indicating whether the multi-audio descriptor field includes a valid language code;
   a mixed audio field indicating whether main audio data and supplemental audio data are pre-mixed;
   a supplemental audio type (SAT) present field indicating whether the multi-audio descriptor field includes information regarding a type of valid supplemental audio data;
   a supplemental audio type field indicating a type of supplemental audio data for the audio data; and
   a language code field indicating a language code of the audio data.

7. The data transmitting apparatus as claimed in claim 1, wherein a header of the generated audio metadata packet comprises the split screen information field.

8. A data receiving apparatus, comprising:
   a receiver configured to receive, from a data transmitting apparatus, an audio metadata packet associated with audio data; and
   a parser configured to parse the received audio metadata packet,
   wherein the received audio metadata packet comprises a split screen information field in relation to the audio data,
   wherein the split screen information field comprises a split screen valid field and a split screen configuration field, the split screen valid field indicating whether a split screen is supported,
   wherein, when the split screen valid field is set to a first predefined value, the split screen configuration field is valid and indicates a split screen mode that determines how a screen is split, and
   wherein, when the split screen valid field is set to a second predefined value, the split screen configuration field is invalid.

9. The data receiving apparatus as claimed in claim 8, wherein the first predetermined value is 1 and the second predetermined value is 0, and the split screen configuration field is specified in a 7-bit field that follows after the split screen valid field.

10. The data receiving apparatus as claimed in claim 8, wherein the split screen mode comprises at least one of:
    a first split mode in which a display screen is split horizontally;
    a second split mode in which the display screen is split vertically;
    a third split mode in which a picture-in-picture (PIP) screen is displayed within the display screen; and
    a fourth split mode in which the display screen is split into three or more screens.

11. The data receiving apparatus as claimed in claim 8, wherein the received audio metadata packet further comprises at least one of:
    a view type field indicating whether a transmitted content is a multi-view content or a single-view content;
    a sequence number field indicating a sequence number of the received audio metadata packet; and
    an audio stream number field indicating information on a number of transmitted audio streams.

12. The data receiving apparatus as claimed in claim 8, wherein a payload of the received audio metadata packet comprises a multi-audio descriptor field indicating metadata regarding a sub packet of a multi-audio sample packet.

13. The data receiving apparatus as claimed in claim 12, wherein the multi-audio descriptor comprises at least one of:
    a split screen tag field indicating split screen information corresponding to the audio data,
    an associated view identification (ID) field indicating a view corresponding to the audio data,
    a valid language code field indicating whether the multi-audio descriptor field includes a valid language code,
    a mixed audio field indicating whether main audio data and supplemental audio data are pre-mixed,
    a supplemental audio type (SAT) present field indicating whether the multi-audio descriptor field includes information regarding a type of valid supplemental audio data;
    a supplemental audio type field indicating a type of supplemental audio data for the audio data; and
    a language code field indicating a language code of the audio data.

14. The data receiving apparatus as claimed in claim 8, wherein a header of the received audio metadata packet comprises the split screen information field.

15. A data transceiving system, comprising:
    a data transmitting apparatus configured to generate an audio metadata packet associated with audio data and transmit the generated audio metadata packet to a data receiving apparatus; and
    the data receiving apparatus configured to receive the transmitted audio metadata packet from the data transmitting apparatus,
    wherein the generated audio metadata packet includes a split screen information field regarding the audio data,
    wherein the split screen information field comprises a split screen valid field and a split screen configuration field, the split screen valid field indicating whether a split screen is supported,
    wherein, when the split screen valid field is set to a first predefined value, the split screen configuration field is valid and indicates split screen mode that determines how a screen is split, and wherein, when the split screen valid field is set to a second predefined value, the split screen configuration field is invalid.

16. The data transceiving system as claimed in claim 15, wherein a header of the generated audio metadata packet comprises the split screen information field.

17. A data transmitting method, comprising:
generating an audio metadata packet associated with audio data; and
transmitting the generated audio metadata packet to a data receiving apparatus,
wherein the generated audio metadata packet comprises a split screen information field regarding the audio data,
wherein the split screen information field comprises a split screen valid field and a split screen configuration field, the split screen valid field indicating whether a split screen is supported,
wherein, when the split screen valid field is set to a first predefined value, the split screen configuration field indicates a split screen mode that determines how a screen is split, and
wherein, when the split screen valid field is set to a second predefined value, the split screen configuration field is invalid.

18. The data transmitting method as claimed in claim 17, wherein the first predetermined value is 1, and the split screen configuration field is specified in a 7-bit field that follows after the split screen valid field.

19. The data transmitting method as claimed in claim 17, wherein the split screen mode comprises at least one of:
a first split mode in which a display screen is split horizontally;
a second split mode in which the display screen is split vertically;
a third split mode in which a picture-in-picture (PIP) screen is displayed within the display screen; and
a fourth split mode in which the display screen is split into three or more screens.

20. The data transmitting method as claimed in claim 17, wherein the generated audio metadata packet further comprises at least one of:
a view type field indicating whether a transmitted content is a multi-view content or a single-view content;
a sequence number field indicating a sequence number of the generated audio metadata packet; and
an audio stream number field indicating information on a number of transmitted audio streams.

21. The data transmitting method as claimed in claim 17, wherein a payload of the generated audio metadata packet comprises a multi-audio descriptor field indicating metadata regarding a sub packet of a multi-audio sample packet.

22. The data transmitting method as claimed in claim 21, wherein the multi-audio descriptor comprises at least one of:
a split screen tag field indicating split screen information corresponding to the audio data;
an associated view identification (ID) field indicating a view corresponding to the audio data;
a valid language code field indicating whether the multi-audio descriptor field includes a valid language code;
a mixed audio field indicating whether main audio data and supplemental audio data are pre-mixed;
a supplemental audio type (SAT) present field indicating whether the multi-audio descriptor field includes information regarding a type of valid supplemental audio data;
a supplemental audio type field indicating a type of supplemental audio data for the audio data; and
a language code field indicating a language code of the audio data.

23. The data transmitting method as claimed in claim 17, wherein a header of the generated audio metadata packet comprises the split screen information field.

24. A data receiving method, comprising:
receiving an audio metadata packet, associated with audio data, from a data transmitting apparatus; and
parsing the received audio metadata packet,
wherein the received audio metadata packet comprises a split screen information field regarding the audio data,
wherein the split screen information field comprises a split screen valid field and a split screen configuration field, the split screen valid field indicating whether a split screen is supported,
wherein, when the split screen valid field is set to a first predefined value, the split screen configuration field indicates a split screen mode that determines how a screen is split, and
wherein, when the split screen valid field is set to a second predefined value, the split screen configuration field is invalid.

25. The data receiving method as claimed in claim 24, wherein the first predetermined value is 1, and the split screen configuration field is specified in a 7-bit field that follows after the split screen valid field.

26. The data receiving method as claimed in claim 24, wherein the split screen mode comprises at least one of:
a first split mode in which a display screen is split horizontally;
a second split mode in which the display screen is split vertically;
a third split mode in which a picture-in-picture (PIP) screen is displayed within the display screen; and
a fourth split mode in which the display screen is split into three or more screens.

27. The data receiving method as claimed in claim 24, wherein the received audio metadata packet further comprises at least one of:
a view type field indicating whether a transmitted content is a multi-view content or a single-view content;
a sequence number field indicating a sequence number of the received audio metadata packet; and
an audio stream number field indicating information on a number of transmitted audio streams.

28. The data receiving method as claimed in claim 24, wherein a payload of the received audio metadata packet comprises a multi-audio descriptor field indicating metadata regarding a sub packet of a multi-audio sample packet.

29. The data receiving method as claimed in claim 28, wherein the multi-audio descriptor comprises at least one of:
a split screen tag field indicating split screen information corresponding to the audio data;
an associated view ID field indicating a view corresponding to the audio data;
a valid language code field indicating whether the multi-audio descriptor field includes a valid language code;
a mixed audio field indicating whether main audio data and supplemental audio data are pre-mixed;
an supplemental audio type (SAT) present field indicating whether the multi-audio descriptor field includes information regarding a type of valid supplemental audio data;
a supplemental audio type field indicating a type of supplemental audio data for the audio data; and
a language code field indicating a language code of the audio data.

30. The data receiving method as claimed in claim 24, wherein a header of the received audio metadata packet comprises the split screen information field.

\* \* \* \* \*